US006800690B2

(12) United States Patent
Rajagopalan et al.

(10) Patent No.: US 6,800,690 B2
(45) Date of Patent: Oct. 5, 2004

(54) GOLF BALLS INCORPORATING POLYAMIDE POLYMERS

(75) Inventors: Murali Rajagopalan, South Dartmouth, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 78 days.

(21) Appl. No.: 10/138,304

(22) Filed: May 6, 2002

(65) Prior Publication Data

US 2003/0078348 A1 Apr. 24, 2003

Related U.S. Application Data

(63) Continuation-in-part of application No. 09/960,393, filed on Sep. 24, 2001, now Pat. No. 6,646,061, which is a continuation of application No. 09/311,288, filed on May 14, 1999, now Pat. No. 6,294,617, which is a division of application No. 08/862,831, filed on May 23, 1997, now Pat. No. 5,981,654, application No. 10/138,304, which is a continuation-in-part of application No. 09/436,738, filed on Nov. 9, 1999, now Pat. No. 6,384,136, which is a continuation of application No. 08/950,197, filed on Oct. 14, 1997, now Pat. No. 5,981,658, which is a continuation-in-part of application No. 08/658,338, filed on Jun. 5, 1996, now Pat. No. 5,824,746, which is a continuation-in-part of application No. 08/482,514, filed on Jun. 7, 1995, now Pat. No. 5,703,166, which is a continuation-in-part of application No. 08/377,553, filed on Jan. 24, 1995, now abandoned.

(51) Int. Cl.$^7$ .............................................. A63B 37/12
(52) U.S. Cl. ..................... 525/183; 525/432; 528/335; 473/371; 473/374; 473/378; 473/385
(58) Field of Search ................................ 525/183, 432; 528/335; 473/371, 374, 378, 385

(56) References Cited

U.S. PATENT DOCUMENTS

| | | | |
|---|---|---|---|
| 3,262,272 A | 7/1966 | Barakauskas et al. ....... 60/39.05 |
| 3,572,722 A | 3/1971 | Harrison et al. ............. 273/218 |
| 3,870,841 A | 3/1975 | Makowski et al. ..... 260/23.7 R |
| 3,957,733 A | * 5/1976 | Rogier et al. ................ 528/339 |
| 4,102,876 A | 7/1978 | Brenner et al. ............... 526/19 |
| 4,234,184 A | 11/1980 | Deleens et al. ............. 273/235 |
| 4,255,540 A | 3/1981 | Weiss ......................... 525/332 |
| 4,274,637 A | 6/1981 | Molitor ....................... 273/235 |
| 4,331,786 A | 5/1982 | Foy et al. .................... 525/408 |
| 4,431,193 A | 2/1984 | Nesbitt .................... 273/235 R |
| 4,679,795 A | 7/1987 | Melvin et al. ............... 273/235 |
| 4,781,383 A | 11/1988 | Kamada et al. ............. 273/228 |
| 4,840,982 A | 6/1989 | Campbell et al. ............ 524/151 |
| 4,858,924 A | 8/1989 | Saito et al. .................. 273/235 |
| 4,884,814 A | 12/1989 | Sullivan ................. 273/235 R |
| 4,911,451 A | 3/1990 | Sullivan et al. ......... 273/235 R |
| 4,956,438 A | 9/1990 | Ruetman et al. .............. 528/60 |
| 4,968,038 A | 11/1990 | Yamada ...................... 273/232 |
| 4,986,545 A | 1/1991 | Sullivan ..................... 273/235 |
| 5,002,281 A | 3/1991 | Nakahara et al. ........... 273/220 |
| 5,098,105 A | 3/1992 | Sullivan ..................... 273/235 |
| 5,106,916 A | 4/1992 | Mitchell ..................... 525/255 |
| 5,120,791 A | 6/1992 | Sullivan ..................... 525/196 |
| 5,155,157 A | 10/1992 | Statz et al. ................. 525/183 |
| 5,187,013 A | 2/1993 | Sullivan ..................... 428/407 |
| 5,253,871 A | 10/1993 | Viollaz ....................... 273/228 |
| 5,272,236 A | 12/1993 | Lai et al. .................. 526/348.5 |
| 5,278,272 A | 1/1994 | Lai et al. .................. 526/348.5 |
| 5,281,679 A | 1/1994 | Jejelowo et al. ............ 526/114 |
| 5,312,857 A | 5/1994 | Sullivan ..................... 524/400 |
| 5,321,089 A | 6/1994 | Cadorniga et al. .......... 525/196 |
| 5,324,783 A | 6/1994 | Sullivan ..................... 525/196 |
| 5,330,837 A | 7/1994 | Sullivan ..................... 428/407 |
| 5,334,673 A | 8/1994 | Wu ............................ 273/235 |
| 5,338,610 A | 8/1994 | Sullivan ..................... 428/407 |
| 5,346,963 A | 9/1994 | Hughes ....................... 525/285 |
| 5,359,000 A | 10/1994 | Hamada et al. ............... 525/74 |
| 5,359,015 A | 10/1994 | Jejelowo ..................... 526/114 |
| 5,367,028 A | 11/1994 | Hamada et al. ............. 525/221 |
| 5,397,840 A | 3/1995 | Sullivan et al. ............ 525/221 |
| 5,407,998 A | 4/1995 | Horiuchi et al. ............ 525/133 |
| 5,484,870 A | 1/1996 | Wu ............................. 528/28 |
| 5,492,972 A | 2/1996 | Stefani ....................... 525/196 |
| 5,556,098 A | 9/1996 | Higuchi et al. ............. 473/373 |

(List continued on next page.)

FOREIGN PATENT DOCUMENTS

| | | |
|---|---|---|
| AU | A-60631/96 | 1/1997 |
| EP | 0 266 994 A2 | 5/1988 |
| EP | 0 633 043 B1 | 1/1995 |
| GB | 1 04 7254 | 11/1966 |
| GB | 2 278 609 | 12/1994 |
| GB | 2 292 387 | 2/1996 |
| JP | 59049229 * | 3/1984 |
| JP | 63 009461 | 1/1988 |
| JP | 6-192512 | 7/1994 |
| JP | 081873 06 A2 | 7/1996 |
| JP | 9-658 | 1/1997 |
| JP | 09070451 | 3/1997 |
| WO | 96/70516 | 12/1996 |

OTHER PUBLICATIONS

U.S. patent application No. 09/677,871 filed Oct. 3, 2000 entitled "Golf Ball Compositions Formed From Single Site Catalyzed Polymers".

U.S. patent application No. 09/453,701 filed Dec. 3, 1999 entitled "Gold Ball Comprising Water Resistant Polyurethane Elastomers and Method for Making Same".

U.S. patent application No. 09/833,667 filed Apr. 13, 2001 entitled "Golf Balls Containing Interpenetrating Polymer Networks".

(List continued on next page.)

Primary Examiner—David J. Buttner
(74) Attorney, Agent, or Firm—Swidler Berlin Shereff Friedman, LLP

(57) ABSTRACT

Golf balls having at least one layer formed from compositions including a polyamide a copolymer that lacks affinity for water formed from at least one dibasic acid and at least one diamine. The polyamide copolymer compositions may be mixed with ionomers or non-ionomers, including grafted or non-grafted metallocene catalyzed polymers.

25 Claims, 2 Drawing Sheets

U.S. PATENT DOCUMENTS

| | | | |
|---|---|---|---|
| 5,679,745 A | 10/1997 | Hamada et al. | 525/195 |
| 5,688,191 A | 11/1997 | Cavallaro | 473/378 |
| 5,692,974 A | 12/1997 | Wu et al. | 473/377 |
| 5,733,974 A | 3/1998 | Yamada | 473/377 |
| 5,820,486 A | 10/1998 | Tanaka et al. | 473/374 |
| 5,824,746 A | 10/1998 | Harris | 525/221 |
| 5,830,087 A | 11/1998 | Sullivan | 473/385 |
| 5,885,172 A | 3/1999 | Hebert et al. | 473/354 |
| 5,886,103 A | 3/1999 | Bellinger et al. | 525/179 |
| 5,981,658 A | 11/1999 | Rajagopalan | 525/72 |
| 6,001,930 A | 12/1999 | Rajagopalan | 525/92 B |
| 6,294,617 B1 | 9/2001 | Rajagopalan | 525/425 |
| 6,506,851 B2 | 1/2003 | Wu | 525/415 |
| 6,518,358 B1 | 2/2003 | Wu | 524/720 |

OTHER PUBLICATIONS

U.S. patent application No. 09/861,909 filed May 21, 2001 entiteld "Urethane Elastomers With Improved Color Stability".

U.S. patent application No. 09/466,434 filed Dec. 17, 1999 entitled "Golf Ball Comprising Saturated Polyurethanes and Methods of Making The Same".

Xiao et al., Advances in Urethane Ionomers, Technomic Publishing Co., Inc.

MacKnigh et al., Jr., Journal of Polymer Science Macromolecular Reviews, 16:99–101 (1981).

Gao et al., Macromol., 25:6460–6465 (1992).

Lu et al., Macromol., 25:6185–6189 (1992).

Weiss et al., Polymer, 35(9):1963–1969 (1994).

Rajagopalan et al., J. Polym. Sci. Pt. B, Polym. Physics, 33:495–503 (1995).

Ann M. Thayer, "Metallocene Catalysts Initate New Era in Polymer Synthesis," Chemical & Engineering News, Sep. 11, 1995, pp. 15–20.

Sentinel Products Update, Metallocene Polyolefin Foam & Cellular Rubber, Summer 1995.

P.S. Chum et al., "Structure/Property Relationships in Polyolefins Made by Constrained Geometry Catalyst Technology," Plastics Engineering, Jun. 1995, pp. 21–23.

Jan H. Schut, "Competition for Metallocences Could Turn Ugly," Plastics World, Jan. 1995, pp. 33–36.

Smith et al., "Applications and Advantages of Flexible Metallocene Polyolefin Foams," SPO '95, 1995, pp. 95–107.

Robert D. Leaversuch, "Metallocene Resins: Is the Revolution for Real?" Modern Plastics, Jun. 1994, pp. 48–50.

Exxon Chemical Co., "Exact Facts," Exxpol Technology, Jun. 1994 pp. 1–8.

T.C. Yu et al., "Polyolefin Modification with EXACT Plastomers," SPE RETEC Polyolefins VIII Conference, Feb. 1993.

Matthew H. Naitove, "Novel Rheological Behavior Claimed for New–Tech Polyolefins," Plastics Technology, Nov. 1992, pp. 23 & 25.

* cited by examiner

GOLF BALLS INCORPORATING POLYAMIDE POLYMERS

This application is a continuation-in-part of U.S. patent application Ser. No. 09/960,393, filed Sep. 24, 2001, now U.S. Pat. No. 6,646,061, which is a continuation of U.S. application Ser. No. 09/311,288, filed on May 14, 1999, now U.S. Pat. No. 6,294,617, which is a divisional of U.S. application Ser. No. 08/862,831, filed May 23, 1997, now U.S. Pat. No. 5,981,654. This application is also a continuation-in-part of U.S. application Ser. No. 09/436,738, filed on Nov. 9, 1999, now U.S. Pat. No. 6,384,136, which is a continuation of U.S. application Ser. No. 08/950,197, filed on Oct. 14, 1997, now U.S. Pat. No. 5,981,658, which is a continuation-in-part of U.S. application Ser. No. 08/658,338, filed on Jun. 5, 1996, now U.S. Pat. No. 5,824,740, which is a continuation-in-part of U.S. application Ser. No. 08/482,514, filed on Jun. 7, 1995, now U.S. Pat. No. 5,703,166, which is a continuation-in-part of U.S. application Ser. No. 08/377,553 filed Jan. 24, 1995 (now abandoned). These references are incorporated by reference herein in their entirety.

FIELD OF THE INVENTION

The present invention relates to golf balls having at least one layer formed from compositions including at least one of a polyamide, in the form of a homopolymer, a copolymer or mixtures thereof, or an olefinic polymer produced using a single-site metallocene catalyst in the polymerization process, to which at least one pendant functional group has been grafted by a post-polymerization reaction. The polyamide compositions may be mixed with ionomers or non-ionomers, including grafted or non-grafted metallocene catalyzed polymers. The grafted metallocene catalyzed polymer compositions may be mixed with at least one of an ionomer, a non-grafted or unfunctionalized metallocene catalyzed polymer, polyamide, or other non-ionomeric polymer to form a blend. The compositions may be used in any layer of a golf ball, may be foamed or unfoamed, and may include at least one density-adjusting filler.

BACKGROUND OF THE INVENTION

Golf ball manufacturers are constantly attempting to construct golf balls having a desirable combination of good "feel," distance, and durability. One way in which the properties of a golf ball may be adjusted is through the cover composition and construction of the ball. Traditionally, softer feeling golf balls were obtained by providing an outer cover formed with natural or synthetic balata over a liquid center surrounded by a tensioned elastomeric wound layer. Because of its softness, however, balata is susceptible to cuts or other damage to the cover, and, thus, lacks the durability required to withstand the numerous mis-hits produced by the average golfer.

For this reason, amateur golfers typically prefer a golf ball constructed with a harder, more durable cover material, such as an ionomer or ionomer blend. Covers formed of ionomeric materials generally provide a good combination of distance and durability. Because of the hard ionomer cover, these balls are difficult to cut, but have a very hard "feel", and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ionomer-covered ball, but none have succeeded totally. U.S. Pat. Nos. 4,884,814, 5,120,791, 5,324,783 and 5,492,972 are examples of such attempts through blends of high hardness and low hardness ionomers. None of the disclosed ionomer blends, however, have resulted in the ideal balance of carrying distance, coefficient of restitution, spin rate and initial velocity that would approach the highly-desirable playability of a balata covered golf ball. In addition, blends of more than one variety of polymer, e.g., ionomer and balata or ionomer and a non-ionic polymer, have also not successfully been used or have not been disclosed in the prior art for use in golf ball components to achieve a combination of feel and durability.

For example, golf ball components formed of unique blends of ionomers and nonionomers, such as metallocene catalyzed polymers, are absent from the prior art. While blends of ionomers and metallocene catalyzed polymers are not disclosed in the prior art, processes for grafting monomers onto polymers, and, in particular, polyolefins, however, are disclosed in European Patent No. 266994 and U.S. Pat. No. 5,106,916. European Patent No. 266994 discloses a method of admixing a metallocene catalyzed polymer with a monomer capable of bonding to the metallocene catalyzed polymer and an organic peroxide, and mixing the admixture at a temperature greater than the melting point of the metallocene catalyzed polymer for a time sufficient for the post-polymerization reaction to occur. Typically, the mixing is continued for at least four times the half-life of the organic peroxide. Although the monomer, metallocene catalyzed polymer, and the peroxide may be added in any order, preferably, the metallocene catalyzed polymer and monomer are thoroughly mixed before the peroxide is added.

Grafted metallocene catalyzed polymers share the advantages of non-grafted metallocene catalyzed polymers including a narrow molecular weight distribution and uniform molecular architecture. These features provide metallocene catalyzed polymers with properties that are not available with conventional polymers, and allow polymers to be produced having unique properties that are specifically tailored to a particular application. The desired molecular weight distribution and the molecular architecture are obtained by the selection of the appropriate metallocene catalyst and polymerization conditions.

Because the prior art blended compositions lack the combination of durability and distance provided by two-piece golf balls with ionomer covers and the high spin rate and control that is available with three-piece, wound golf balls having balata covers, there remains a need in the art for a golf ball that possesses these characteristics. In particular, there is a need in the art for a golf ball incorporating non-ionomers, such as non-grafted and grafted metallocene catalyzed polymers, and other polymers, such as ionomers and polyamides. The inclusion of foamed and unfoamed grafted metallocene catalyzed polymers and grafted metallocene catalyzed polymer blends will allow highly durable golf balls to be produced with improved performance and virtually any combination of feel and spin rate.

SUMMARY OF THE INVENTION

The present invention is directed to a golf ball comprising a layer formed from a composition including at least one polyamide formed from at least one dibasic acid and at least one diamine and at least one metallocene catalyzed polymer, wherein the metallocene catalyzed polymer has been functionalized by sulfonation, carboxylation, addition of an amine or hydroxy, or by grafting an ethylenically unsaturated monomer onto the at least one metallocene catalyzed polymer using a post-polymerization reaction.

The present invention is also directed to a golf ball having a core and a cover, wherein at least a portion of the cover is formed from a composition including a polyamide copolymer formed from at least one dibasic acid and at least one diamine, wherein the at least one dibasic acid comprises about 14 carbons to about 40 carbons, and wherein the polyamide copolymer lacks affinity for water.

The present invention is further directed to a golf ball having a layer formed from a composition including at least one polyamide formed from at least one dibasic acid and at least one diamine and a metallocene catalyzed polymer comprising a copolymer of ethylene or propylene with butene, hexene, or octene.

In one embodiment, the polyamide has a flexural modulus of about 5,000 psi to about 500,000 psi and the metallocene catalyzed polymer has a flexural modulus of about 500 psi to about 200,000 psi. The ethylenically unsaturated monomer may be an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof. In one embodiment, the ethylenically unsaturated monomer is maleic anhydride.

The composition may further include at least one additional agent selected from the group consisting of coloring agents, reaction enhancers, crosslinking agents, whitening agents, UV absorbers, processing aids, antioxidants, stabilizers, softening agents, plasticizers, impact modifiers, density-adjusting fillers, foaming agents, excipients, reinforcing materials, compatibilizers, and mixtures thereof.

In one embodiment, the layer has a foamed structure.

In another embodiment, the layer has a thickness of about 0.1 inches or less and is disposed between a core and an outer cover. In another embodiment, the layer is an inner cover layer having a thickness of about 0.02 inches to about 0.06 inches. In yet another embodiment, the inner cover layer has a thickness of about 0.02 inches to about 0.35 inches. The outer cover may have a thickness of about 0.02 inches to about 0.035 inches. In one embodiment, the core has a diameter of about 1.5 inches to about 1.6 inches, and in another embodiment, the core includes an inner core layer and an outer core layer.

In one embodiment, the outer cover is formed of a castable reactive liquid material comprising thermoset cast polyurethane, polyurea, epoxy, reaction injection moldable materials, or mixtures thereof. In another embodiment, the layer is a tensioned elastomeric layer.

In another embodiment, the ratio of the Shore D hardness of the outer cover to the layer is about 1.0 or less, the ratio of the thickness of the layer to the outer cover is about 3 or less, or the ratio of the flexural modulus of the layer to the outer cover is about 0.11 to about 4.5. In one embodiment, the polyamide copolymer has a flexural modulus of about 5,000 psi to about 200,000 psi.

In one embodiment, the metallocene catalyzed polymer is functionalized by sulfonation, carboxylation, addition of an amine or hydroxy, or by grafting an ethylenically unsaturated monomer onto the at least one metallocene catalyzed polymer using a post-polymerization reaction. In another embodiment, the composition further includes a non-grafted metallocene catalyzed polymer.

In another embodiment, the composition of the invention further includes an ionomer, wherein the ionomer comprises an E/X/Y copolymer where E comprises ethylene, X comprises a softening comonomer from about 0 weight percent to about 50 weight percent of the copolymer, and Y comprises an $\alpha$, $\beta$-ethylenically unsaturated carboxylic acid from about 5 weight percent to about 35 weight percent of the copolymer, wherein about 1 percent to about 100 percent of the carboxylic acid is neutralized with a metal ion.

In yet another embodiment, the polyamide copolymer is ionomeric and comprises a sulfonated moiety, a carboxylated moiety, or a combination thereof.

Preferred polyamide polymers include polyamide homopolymers, polyamide copolymers and mixtures thereof, where the polyamide polymer has a flexural modulus of about 30,000 psi to about 200,000 psi, where the polyamide homopolymer is polyamide 6, polyamide 11, polyamide 12, polyamide 4,6, polyamide 6,6, polyamide 6,9, polyamide 6,10, polyamide 6,12, 6,18, 6,36, or mixtures thereof, and where the polyamide copolymer is polyamide 6/6,6, polyamide 6,6/6,10, polyamide 6/6,T, polyamide 6/6, 6/6,10, polyamide 66,6,18, polyamide 66,6,36, polyamide 6/6,18, polyamide 6/6,36, polyamide 6/6,10/6,18, polyamide 6/6,10/6,36, polyamide 6,10/6,18, polyamide 6,12/6, 18, polyamide 6,12/6,36, polyamide 6/66/6,18, polyamide 6/66/6,36, polyamide 66/6,10/6,18, polyamide 66/6,10/6, 36, polyamide 6/6,12/6,18, polyamide 6/6,12/6,36, or mixtures thereof.

The present invention also relates to a golf ball including a cover and a core, where the cover is formed composition that includes a blend of about 1 weight percent to about 99 weight percent of at least one nonionomer polymer and about 99 weight percent to about 1 weight percent of at least one polyamide polymer. In another embodiment the composition includes a blend of about 0 weight percent to about 99 weight percent of at least one nonionomer polymer and about 100 weight percent to about 1 weight percent of at least one polyamide polymer. In one embodiment, the composition is substantially optical brightener-free.

Nonionomer polymers useful in the invention, when present, have a flexural modulus of about 1,000 psi to about 150,000 psi and include but are not limited to block copoly (ester-ester), block copoly(ester-ether), block copoly(amide-ester), block copoly(amide-ether), block copoly(urethane-ester), block copoly(urethane-ether), a block polystyrene thermoplastic elastomer including an unsaturated rubber, a block polystyrene thermoplastic elastomer including a functionalized substantially saturated rubber, a thermoplastic and elastomer blend including polypropylene and ethylene-propylene-diene monomer terpolymer or ethylene-propylene copolymer rubber where the rubber is dynamically vulcanized, poly(ethylene terephthalate), poly (butylene terephthalate), poly(trimethylene terephthalate), poly(vinyl alcohol), poly(vinyl acetate), poly(silane), poly (vinylidene fluoride), acrylonitrile-butadiene-styrene copolymer, olefinic polymers, their copolymers, including functional comonomers, and mixtures thereof.

In another embodiment, the invention relates to a golf ball including a cover and a core, where the cover is formed of a composition of about 15 weight percent to about 75 weight percent of at least one nonionomer polymer and about 85 weight percent to about 25 weight percent of at least one polyamide polymer. The composition may be substantially optical brightener-free.

An additional embodiment of the present invention is a golf ball including a cover layer, a core layer and at least one intermediate layer interposed between the cover layer and the core layer, where at least one of the layers includes about 1 weight percent to about 99 weight percent of at least one nonionomer thermoplastic polymer and about 99 weight percent to about 1 weight percent of at least one polyamide polymer. In an additional embodiment, the composition includes about 0 weight percent to about 99 weight percent of at least one nonionomer thermoplastic polymer and about 100 weight percent to about 1 weight percent of at least one polyamide polymer. In yet another embodiment, the composition may be substantially optical brightener-free.

An alternate embodiment of the present invention is directed to a golf ball including a cover layer, a core layer, and at least one intermediate layer interposed between the cover layer and the core layer, wherein at least one of the layers includes a composition having about 1 weight percent to about 99 weight percent of at least one nonionomer thermoplastic elastomer polymer and about 99 weight percent to about 1 weight percent of at least one polyamide polymer, and where the nonionomer thermoplastic elastomer polymer is selected from the group consisting of block copoly(ester-ester), block copoly(ester-ether), block copoly (amide-ester), block copoly(amide-ether), block copoly (urethane-ester), block copoly(urethane-ether), a thermoplastic and elastomer blend including polypropylene and ethylene-propylene-diene monomer terpolymer or ethylene-propylene copolymer rubber where the rubber is dynamically vulcanized, and mixtures thereof. In yet another embodiment, the composition may be substantially optical brightener-free.

A further alternate embodiment of the present invention is directed to a golf ball including a cover layer, a core layer and at least one intermediate layer interposed between the cover layer and the core layer, where at least one of the layers includes a composition having about 51 weight percent to about 99 weight percent of at least one nonionomer thermoplastic elastomer polymer and about 49 weight percent to about 1 weight percent of at least one polyamide polymer, where the nonionomer thermoplastic elastomer polymer is selected from the group which further includes a block polystyrene thermoplastic elastomer including an unsaturated rubber and a block polystyrene thermoplastic elastomer including a functionalized substantially saturated rubber. The composition may be substantially optical brightener-free.

An additional further alternate embodiment of the present invention is directed to a golf ball including a cover layer, a core layer and at least one intermediate layer interposed between the cover layer and the core layer, where at least one of the layers includes a composition where the nonionomer thermoplastic elastomer polymer is selected from the group which further includes a block polystyrene thermoplastic elastomer including an unsaturated rubber and a block polystyrene thermoplastic elastomer including a functionalized substantially saturated rubber and where the polyamide polymer is combined with an amount of the nonionomer thermoplastic elastomer sufficient to form a mixture such that the flexural modulus of the mixture is less than about 70,000 psi. In one embodiment, the composition is substantially optical brightener-free.

In any of the above additional embodiments and alternate embodiments, when at least one intermediate layer includes polyamide, the cover preferably includes at least one material selected from the group consisting of nonionic olefinic polymers, polyamide, polyolefin ionomers, styrene-butadiene-styrene ionomers, styrene-(hydrogenated butadiene)-styrene ionomers, poly(isoprene), poly (butadiene), a thermoset poly(urethane), and a thermoset poly(urea).

Another embodiment of the present invention is a golf ball including a cover layer, a core layer and at least one intermediate layer interposed between the cover layer and the core layer, where at least one of the layers includes a composition having about 15 weight percent to about 75 weight percent of at least one nonionomer thermoplastic polymer and about 85 weight percent to about 25 weight percent of at least one polyamide polymer. The composition may be substantially optical brightener-free.

Another additional embodiment of the present invention is a golf ball including a cover layer, a core layer and at least one intermediate layer interposed between the cover layer and the core layer, where at least one of the layers includes a composition having about 15 weight percent to about 75 weight percent of at least one nonionomer thermoplastic elastomer polymer and about 85 weight percent to about 25 weight percent of at least one polyamide polymer, and where the nonionomer thermoplastic elastomer polymer is selected from the group consisting of block copoly(ester-ester), block copoly(ester-ether), block copoly(amide-ester), block copoly(amide-ether), block copoly(urethane-ester), block copoly(urethane-ether), a thermoplastic and elastomer blend including polypropylene and ethylene-propylene-diene monomer terpolymer or ethylene-propylene copolymer rubber where the rubber is dynamically vulcanized, and mixtures thereof. In one embodiment, the composition is substantially optical brightener-free.

Another further additional embodiment of the present invention is a golf ball including a cover layer, a core layer and at least one intermediate layer interposed between the cover layer and the core layer, where at least one of the layers includes a composition having about 51 weight percent to about 75 weight percent of at least one nonionomer thermoplastic elastomer polymer and about 49 weight percent to about 25 weight percent of at least one polyamide polymer, where the nonionomer thermoplastic elastomer polymer is selected from the group which further includes a block polystyrene thermoplastic elastomer including an unsaturated rubber and a block polystyrene thermoplastic elastomer including a functionalized substantially saturated rubber. In one embodiment, the composition is substantially optical brightener-free.

In a separate embodiment of the present invention, a golf ball including a cover layer and a core has at least one intermediate layer interposed between the cover layer and the core, where one of the layers includes a composition having about 1 weight percent to about 99 weight percent of at least one nonionomer thermoplastic polymer and about 99 weight percent to about 1 weight percent of at least one polyamide polymer, and where another layer includes a thermoset polymer. Alternatively, however, in a further separate embodiment the composition includes about 0 weight percent to about 99 weight percent of at least one nonionomer thermoplastic polymer and about 100 weight percent to about 1 weight percent of at least one polyamide polymer. The composition may be substantially optical brightener-free.

In a further separate embodiment of the present invention, a golf ball including a cover layer and a core has at least one intermediate layer interposed between the cover layer and the core, where one of the layers includes a composition having about 1 weight percent to about 99 weight percent of at least one nonionomer thermoplastic elastomer polymer and about 99 weight percent to about 1 weight percent of at least one polyamide polymer, where the nonionomer thermoplastic elastomer polymer is selected from the group consisting of block copoly(ester-ester), block copoly(ester-ether), block copoly(amide-ester), block copoly(amide-ether), block copoly(urethane-ester), block copoly(urethane-ether), a thermoplastic and elastomer blend including polypropylene and ethylene-propylene-diene monomer terpolymer or ethylene-propylene copolymer rubber where the rubber is dynamically vulcanized, and mixtures thereof, and where an other one of the layers includes a thermoset polymer. The composition may be substantially optical brightener-free.

In an additional further separate embodiment of the present invention, a golf ball including a cover layer and a core has at least one intermediate layer interposed between the cover layer and the core, where one of the layers includes a composition having about 51 weight percent to about 99 weight percent of at least one nonionomer thermoplastic elastomer polymer and about 49 weight percent to about 1 weight percent of at least one polyamide polymer, where the nonionomer thermoplastic elastomer polymer is selected from the group which further includes a block polystyrene thermoplastic elastomer including an unsaturated rubber and a block polystyrene thermoplastic elastomer including a functionalized substantially saturated rubber. In one embodiment, the composition is substantially optical brightener-free.

Thermoset polymers useful in the invention include but are not limited to poly(isoprene), poly(butadiene), poly(urethane), poly(urea), epoxy, silicone, and mixtures thereof.

The invention also relates to a method of making a golf ball, which includes forming a golf ball core, preparing a composition of about 1 weight percent to about 99 weight percent of at least one nonionomer polymer and about 99 weight percent to about 1 weight percent of at least one polyamide polymer, and molding the blend around the golf ball core to form the golf ball. Alternatively, however, the composition includes about 0 weight percent to about 99 weight percent of at least one nonionomer polymer and about 100 weight percent to about 1 weight percent of at least one polyamide polymer. The composition may be substantially optical brightener-free.

The invention also further relates to a method of making a golf ball, which includes forming a core layer, forming at least one intermediate layer about the core layer, and forming a cover layer over the at least one intermediate layer, where at least one of the layers is formed of a composition including about 1 weight percent to about 99 weight percent of at least one nonionomer thermoplastic polymer and about 99 weight percent to about 1 weight percent of at least one polyamide polymer. Alternatively, however, the composition includes about 0 weight percent to about 99 weight percent of at least one nonionomer thermoplastic polymer and about 100 weight percent to about 1 weight percent of at least one polyamide polymer. The composition may be substantially optical brightener-free.

The invention also additionally relates to a method of making a golf ball, which includes forming a core layer, forming at least one intermediate layer about the core layer, and forming a cover layer over the at least one intermediate layer, where at least one of the layers is formed of a composition including about 1 weight percent to about 99 weight percent of at least one nonionomer thermoplastic elastomer polymer and about 99 weight percent to about 1 weight percent of at least one polyamide polymer, and where the nonionomer thermoplastic elastomer polymer is selected from the group consisting of block copoly(ester-ester), block copoly(ester-ether), block copoly(amide-ester), block copoly(amide-ether), block copoly(urethane-ester), block copoly(urethane-ether), a thermoplastic and elastomer blend including polypropylene and ethylene-propylene-diene monomer terpolymer or ethylene-propylene copolymer rubber where the rubber is dynamically vulcanized, and mixtures thereof. In one embodiment, the composition is substantially optical brightener-free.

The present invention is also directed to golf balls having at least one foamed or unfoamed layer in at least one of the cover, the core, or in one or more intermediate mantles between the cover and the core, where the layer is formed from a composition including at least one metallocene catalyzed polymer that has been functionalized by sulfonation, carboxylation, addition of an amine or hydroxy, or by grafting an ethylenically unsaturated monomer onto the at least one metallocene catalyzed polymer using a post-polymerization reaction. The ethylenically unsaturated monomer is typically an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids and ionomeric derivatives thereof. Preferably, the ethylenically unsaturated monomer is maleic anhydride.

The golf ball compositions of the invention may include a blend of at least one grafted metallocene catalyzed polymer and at least one of an ionomer, a non-grafted, i.e., unfunctionalized, metallocene catalyzed polymer, or a non-ionomeric polymer. Preferably, the composition is a blend of at least one grafted metallocene catalyzed polymer and at least one ionomer, and includes about 5 parts per hundred (phr) to about 90 phr of at least one grafted metallocene catalyzed polymer and about 95 phr to about 10 phr of at least one ionomer, more preferably about 10 phr to about 75 phr of at least one grafted metallocene catalyzed polymer and about 90 phr to about 25 phr of at least one ionomer, and most preferably about 10 phr to about 50 phr of at least one grafted metallocene catalyzed polymer and about 90 phr to about 50 phr of at least one ionomer. Typically, the layer has a Shore D hardness of about 15 to about 80 and a thickness of about 0.005 inch to about 0.125 inch, and the core has a diameter of about 1.0 inch to about 1.63 inches. In addition, a typical grafted metallocene catalyzed polymer has a flexural modulus of about 500 psi to about 200,000 psi, preferably about 1,000 psi to about 150,000 psi and the ionomer has a flexural modulus of about 50 psi to about 150,000 psi. Any of the cover, the core, or a mantle between the cover and the core may further include a density increasing filler material.

Preferably, the grafted metallocene catalyzed polymer is formed by grafting an ethylenically unsaturated monomer onto a metallocene catalyzed polymer selected from the group consisting of polyethylene and copolymers of ethylene with propylene, butene, pentene, hexene, heptene, octene, and norbornene, most preferably, copolymers of ethylene with butene, pentene, hexene, heptene, octene, and norbornene, but may be formed by grafting an ethylenically unsaturated monomer onto any metallocene catalyzed polymer of the formula:

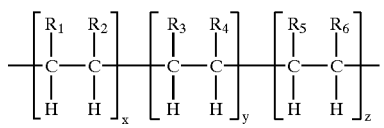

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x is about 99 weight percent to about 50 weight percent of the polymer, y is about 1 to about 50 weight percent of the polymer and z is about 0 to 49 weight percent of the polymer.

DETAILED DESCRIPTION OF THE INVENTION

Figure 1:
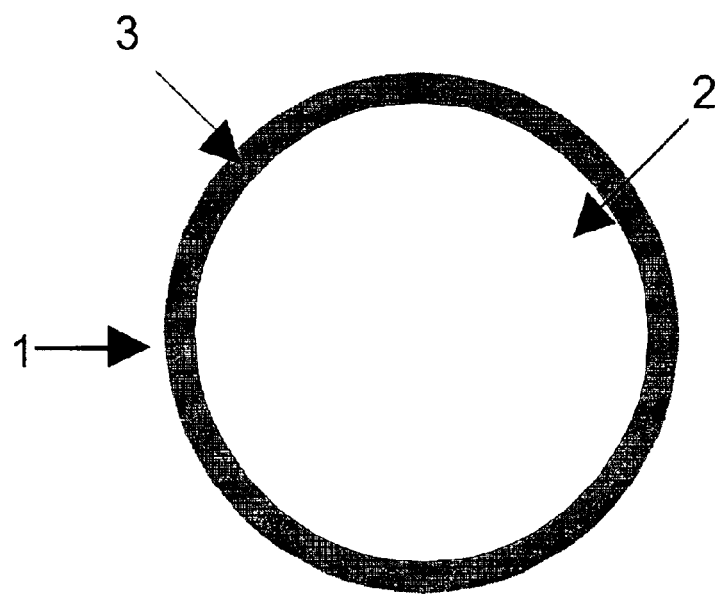
FIG. 1 is a cross-sectional view of a two-piece golf ball according to the invention with a one-piece core.

The present invention relates to golf ball forming compositions having unexpectedly improved durability, initial velocity and shear resistance. In addition, the compositions of the invention provide excellent adherence to light stable materials. For example, a typical intermediate or inner cover layer material, such as an ionomer, adheres adequately to conventional aromatic urethane cover materials, such as MDI-based polyurethane. As new cover materials emerge to make improvements in golf ball design, the traditional materials used in intermediate or inner cover layers may not adhere as well to the new cover materials. For example, a polyurethane cover composition having at least one aliphatic polyurethane prepolymer and at least one aliphatic curative results in a light stable cover resistant to yellowing, but its adherence to a traditional ionomer resin intermediate or inner cover layer is poor. One advantage of the compositions of the present invention is that it provides better adherence with light stable compositions than formerly obtained with traditional materials with improved ball durability upon impact.

The compositions of the invention include at least one polyamide, in the form of a homopolymer, a copolymer or mixtures thereof. Optionally, at least one polyamide is present in the form of a blend with at least one nonionomer polymer or resin, which itself is present in the form of a nonionomer thermoplastic polymer, a nonionomer thermoplastic elastomer or mixtures thereof. The blends of the present invention may be included in various constructions of multilayer golf balls. Polyamide and/or polyamide-nonionomer polymer blends of the invention have unexpectedly improved durability and initial velocity when compared to golf balls formed of ionomers and ionomer blends of the prior art. The invention provides great flexibility for selecting the modulus and hardness of each of the blend components over a wider range than is possible with blends composed solely of ionomer components.

Polyamides

The polyamide component useful in forming the compositions of this invention is a thermoplastic with repeating amide groups, commonly known as nylons. This component can include a homopolymer, a copolymer, including a block copolymer, or a blend of two or more variations of any or all of the above types of polyamides. The polyamide component is prepared from a diamine and a dibasic acid.

Polyamide homopolymers are produced by two common methods. In the first, a compound containing one organic acid-type endgroup and one amine endgroup is formed into a cyclic monomer. The polyamide is then formed from the monomer by a ring-opening addition polymerization. These polyamides are commonly designated as polyamide 6, polyamide 11, polyamide 12, etc., where the number indicates the number of carbon atoms making up the ring in the monomer. The second method involves the condensation polymerization of a dibasic acid and a diamine. These polyamides are commonly designated as polyamide 4,6, polyamide 6,6, polyamide 6,9, polyamide 6,10, polyamide 6,12, polyamide 6,18, polyamide 6,36, etc., where the first number indicates the number of carbon atoms connecting the two amine groups in the diamine and the second number indicates the number of carbon atoms connecting the two acid groups in the dibasic acid, including those in the acid groups.

Preferred polyamide homopolymers include polyamide 4, polyamide 6, polyamide 7, polyamide 11, polyamide 12 (manufactured as Rilsan AMNO by Elf Atochem of Philadelphia, Pa.), polyamide 13, polyamide 4,6, polyamide 6,6, polyamide 6,9, polyamide 6,10, polyamide 6,12, polyamide 6,18, polyamide 6,36, polyamide 12,12, polyamide 13,13 and mixtures thereof. More preferred polyamide homopolymers include polyamide 6, polyamide 11, polyamide 12, polyamide 4,6, polyamide 6,6, polyamide 6,9, polyamide 6,10, polyamide 6,12, and mixtures thereof. The most preferred polyamide homopolymers are polyamide 6, polyamide 11, polyamide 12, polyamide 6,10, and mixtures thereof.

Polyamide copolymers are produced by several common methods. First, they are produced from addition polymerization by using two or more cyclic monomers with different numbers of carbon atoms making up each monomeric ring. Alternatively, polyamide copolymers are produced from condensation polymerization by using a single dibasic acid and two or more different diamines, each with a different number of carbon atoms separating the two amine groups, by using a single diamine and two or more different dibasic acids, each with a different number of carbon atoms separating the two acid groups, or by using two or more different diamines and dibasic acids. Additionally, polyamide copolymers are produced by blending two or more polyamide melts and holding the materials in the molten state for a sufficient time period such that partial or full randomization occurs. Polyamide copolymers are commonly designated by the separating the symbols for the homopolymers by the symbol "/". For the purposes of this application, the component named first can be either the major or a minor component of the copolymer.

Suitable polyamide copolymers include, but are not limited to, polyamide 6/6,6, polyamide 6,6/6,10, polyamide 6/6,T wherein T represents terephthalic acid, polyamide 6/6,6/6,10, polyamide 6,10/6,36, polyamide 66,6,18, polyamide 66,6,36, polyamide 6/6,18, polyamide 6/6,36, polyamide 6/6,10/6,18, polyamide 6/6,10/6,36, polyamide 6,10/ 6,18, polyamide 6,12/6,18, polyamide 6,12/6,36, polyamide 6/66/6,18, polyamide 6/66/6,36, polyamide 66/6,10/6,18, polyamide 66/6,10/6,36, polyamide 6/6,12/6,18, polyamide 6/6,12/6,36, and mixtures thereof.

Preferred polyamides for use in the present invention are unique polyamides, with improved hydrophobicity, having anywhere from about a 14-carbon to about a 40-carbon moiety. Polyamide 6,36, for example, is an 18-carbon chain or 36-carbon chain homopolymer of hexamethylene diamine and dimer acid polyamide (manufactured by Shakespeare of Columbia, S.C.) with improved hydrophobicity compared to conventional polyamides. Because polyamide 6,36 lacks the affinity for water, the unique properties of the polyamide homopolymer are not sacrificed when in combination with other polymers. Polyamide copolymer 6,10/6,36 (manufactured by Shakespeare of Columbia, S.C.) is a combination of polyamide 6,10 and polyamide 6,36, wherein the stiffness is controlled by the 6 carbon atoms connecting the two amine groups in the diamine and the softer segment is controlled by the 10 and 36 carbon atoms connecting the two acid groups.

The polyamide component of this invention has a Shore D hardness of at least about 50, as measured by ASTM method D-2240, a flexural modulus, as measured by ASTM method D-790, of at least about 10,000 psi, preferably from about 30,000 psi to about 200,000 psi, more preferably from about 50,000 psi to about 100,000 psi, and a melt index from about 0.5 to about 100 g/10 min, as measured by ASTM method D-1238, condition E using a 2.16 kg weight.

Polyamide copolymers may have flexural moduli extending beyond the 30,000 psi starting point. For example, depending on the concentration, polyamide 6,18 or polyamide 6,36 each have a flexural modulus range of about 5,000 to about 200,000 psi and polyamide 6,10/6,36 has a flexural modulus from about 5,000 psi to about 300,000 psi. In one embodiment, the polyamides of the invention have flexural moduli about 5,000 psi or greater. In another embodiment, the flexural moduli of the polyamides are about 10,000 psi or greater. In yet another embodiment, the polyamides have flexural moduli of about 500,000 psi or less, preferably from about 300,000 psi or less, and more preferably from about 100,000 psi or less. In yet another embodiment, the polyamides of the present invention have flexural moduli from about 10,000 psi to about 60,000 psi.

In one embodiment, the polyamide may be ionomeric or nonionomeric in nature. In yet another embodiment, the polyamide is ionomeric and includes sulfonated or carboxylated moieties, or a mixture thereof.

Ionomers

For the purposes of this application, an ionomer is a polymer which includes acidic groups, such as carboxylate or sulfonate, or basic groups, such as quaternary nitrogen, the acidic or basic groups being at least partially neutralized with a conjugate acid or base. Negatively charged acidic groups, such as carboxylate or sulfonate, may be neutralized with a cation, such as a metal ion. Positively charged basic groups, such as quaternary nitrogen, may be neutralized with an anion, such as a halide, an organic acid, or an organic halide. Acidic or basic groups may be incorporated into an ionomer through copolymerization of an acidic or basic monomer, such as alkyl (meth)acrylate, with at least one other comonomer, such as an olefin, styrene or vinyl acetate, followed by at least partial neutralization to form an ionomer. Alternatively, acidic or basic groups may be incorporated into a polymer to form an ionomer by reacting the polymer, such as polystyrene or a polystyrene copolymer including a block copolymer of polystyrene, with a functionalizing reagent, such as a carboxylic acid or sulfonic acid, followed by at least partial neutralization.

The manner in which the ionomers are made is well known in the art, as described in, e.g., U.S. Pat. No. 3,262,272, which is incorporated in its entirety by reference herein. Ionomer resins are commercially available from DuPont under the tradename SURLYN® and from Exxon under the tradename Iotek®. Some particularly suitable SURLYNS® include SURLYN® 8140 (Na) and SURLYN® 8546 (Li) which have an methacrylic acid content of about 19 percent.

Examples of suitable ionomer resins and blends thereof are also disclosed in U.S. Pat. No. 5,885,172, which is incorporated in its entirety by reference herein. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). More particularly, such acid-containing ethylene copolymer ionomer component includes E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium*, sodium*, potassium, magnesium*, calcium, barium, lead, tin, zinc* or aluminum (*=preferred), or a combination of such cations.

Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The ionomer also may include so-called "low acid" and "high acid" ionomers. In general, ionic copolymers including up to about 16 percent acid are considered "low acid" ionomers, while those including greater than about 16 percent acid are considered "high acid" ionomers by the present inventors. Examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. A high acid ionomer may be a copolymer of an olefin, e.g., ethylene, and at least 16 weight percent of an $\alpha,\beta$-ethylenically unsaturated carboxylic acid, e.g., acrylic or methacrylic acid, wherein about 10 percent to about 100 percent of the carboxylic acid groups are neutralized with a metal ion, e.g., zinc, sodium, magnesium or lithium. Preferably, the high acid ionomer is a copolymer of ethylene and about 17 weight percent to about 20 weight percent methacrylic acid wherein about 35 percent to about 100 percent of the carboxylic acid groups are neutralized by sodium. Examples of commercially available high acid ionomers include SURLYN® 8140, which is an ethylene-based ionomer believed to include 17 weight percent to about 20 weight percent methacrylic acid and to be neutralized with sodium.

Other suitable ionomers for use in the blends of the present invention include polyolefins, polyesters, polystyrenes, SBS, SEBS, and polyurethanes, in the form of homopolymers, copolymers, or block copolymer ionomers.
Nonionomers The present invention also contemplates the use of a variety of materials blended with at least one polyamide to form golf ball compositions.
Nonionomer Thermoplastic Elastomers One example of a nonionomer for use in a polyamide blend according to the present invention is a nonionomer thermoplastic elastomer. TPEs possess the material and mechanical properties characteristic of an elastomer but, unlike an elastomer, can be processed like a thermoplastic because they exhibit a melting point, which is a characteristic of a thermoplastic. Therefore, a TPE may substitute for an elastomer in imparting desirable rubber properties to a polymer blend while simultaneously maintaining many of the desirable advantages of a thermoplastic during processing, such as low cost fabrication, recyclability of scrap, and rapid, continuous, automated processing.

Generally, TPEs consist of at least two polymer types or phases, each of which has a characteristic softening temperature. One phase is selected to be above its softening point at the use temperature, thereby providing rubbery response, while the other phase is selected to be below its softening point at the use temperature, thereby anchoring the soft material in a manner analogous to the crosslink points of a conventional crosslinked rubber. However, unlike crosslinked rubber, the anchoring effect is reversible and can be removed by heating the TPE to an elevated temperature above both softening points. At the elevated temperature, conventional thermoplastic processing methods are possible. Subsequent cooling to below the upper softening point allows the anchoring effect to be reestablished.

The two polymer types or phases are often chemically joined or bonded to give a block copolymer molecular architecture, but this is not a requirement for exhibiting the typical TPE behavior described above. Mechanical mixing of two polymer types or in situ polymerization or grafting may also result in TPE-like response. A list of 19 discrete chemical types of TPEs is available in Table 2 of the "Kirk-Othmer Encyclopedia of Chemistry and Technology", 4th Ed., Vol. 9, p. 18 (1994).

The preferred nonionomer TPEs of this invention can be characterized by chemical composition to include the following categories: (1) block copoly(ester) copolymers (2) block copoly(amide) copolymers (3) block copoly(urethane) copolymers, (4) styrene-based block copolymers, (5) thermoplastic and elastomer blends wherein the elastomer is not vulcanized (TEB) and (6) thermoplastic and elastomer or rubber blends wherein the elastomer is dynamically vulcanized (TED).

Block copoly(ester) copolymer TPEs (1) include alternating blocks of a polyester oligomer, for example polyalkylene terephthalate (material with the higher softening point), wherein the alkylene group is typically 1,4-butylene, and another block with a lower softening point. Optionally, the block copoly(ester) copolymer can be partially made of at least one thioester. Still further, the block copoly(ester) copolymer TPE can optionally be a block copoly(thioester) copolymer.

If the lower softening point material of the block copoly (ester) copolymer is an ester, for example, a polylactone such as polycaprolactone, then block copoly(ester-esters) result. If the lower softening point material is a polyether oligomer, for example, a polyalkylene ether, then block copoly(ester-ethers) result. If the lower softening point material is a polythioether oligomer, for example, a polythioalkylene ether, then block copoly(ester-thioethers) result. If the lower softening point material is an $\alpha,\beta$-hydroxybutadiene oligomer such as the POLYBD® resins available from Elf Atochem S.A., optionally at least partially hydrogenated, then block copoly(ester-$\alpha,\beta$-hydroxybutadienes) result. Optionally, the lower softening point material may comprise a mixture, for example, a mixture of any of the above-mentioned lower softening point materials, e.g., polyalkylene ethers such as propylene ether and butylene ether, or a mixture of a polyalkylene ether and a polythioalkylene ether. Furthermore, such mixtures of lower softening point materials may be present in a random or block arrangement, or as mixtures thereof Preferably, the block copoly(ester) copolymer TPE is a block copoly(ester-ester), a block copoly(ester-ether), or mixtures thereof. More preferably, the block copoly(ester) copolymer TPE is at least one block copoly(ester-ether) or mixtures thereof. Suitable commercially available TPE copoly(ester-ethers) include the HYTREL® series from DuPont, which includes HYTREL® 3078, G3548W, 4056, G4078W and 6356; the LOMOD® series from General Electric, which includes LOMOD® ST3090A and TE3055A; ARNITEL® and URAFIL® from Akzo; ECDEL® from Eastman Kodak; and RITEFLEX® from Hoechst Celanese.

Block copoly(amide) copolymer TPEs (2) comprise alternating blocks of a polyamide oligomer (material with the higher softening point) and another block with a lower softening point. Block copoly(amides) are described more fully in U.S. Pat. No. 4,331,786 to Foy et al. which is herein incorporated by reference in its entirety. Optionally, the block copoly(amide) copolymer can be partially comprised of at least one thioamide. The block copoly(amide) copolymer TPE can optionally be a block copoly(thioamide) copolymer.

If the lower softening point material of the block copoly (amide) copolymer is, e.g., a polyether oligomer or a polyalkylene ether, for example, poly(ethylene oxide), then block copoly(amide-ethers) result. If the lower softening point material of the block copoly(amide) copolymer is an ester, for example, a polylactone such as polycaprolactone, then block copoly(amide-esters) result. Any of the lower softening point materials cited in the description of the block copoly(ester) copolymers above may be used to form a block copoly(amide) copolymer. Optionally, the lower softening point material of the block copoly(amide) copolymer may comprise a mixture, for example, a mixture of any of the above-mentioned lower softening point materials. Furthermore, said mixtures of lower softening point materials may be present in a random or block arrangement, or as mixtures thereof.

Preferably, the block copoly(amide) copolymer TPE is a block copoly(amide-ester), a block copoly(amide-ether), or mixtures thereof. More preferably, the block copoly(amide) copolymer TPE is at least one block copoly(amide-ether) or mixtures thereof. Suitable commercially available thermoplastic copoly(amide-ethers) include the PEBAX® series from Elf-Atochem, which includes PEBAX® 2533, 3533, 4033 and 6333; the GRILAMID® series by Emser, which includes Ely 60; and VESTAMID® and VESTENAMER® by Hüls.

Block copoly(urethane) copolymer TPEs (3) comprise alternating blocks of a polyurethane oligomer (material with the higher softening point) and another block with a lower softening point. The polyurethane block includes a diisocyanate, typically 4,4'-diphenylmethane diisocyanate, 4,4'-dicyclohexylmethane diisocyanate, 2,4-toluene diisocyanate, 2,6-toluene diisocyanate, para-phenylene diisocyanate or mixtures thereof, chain extended with a diol such as 1,4-butanediol, a dithiol such as 1,4-butanedithiol, a thio-substituted alcohol, such as 1-thiolbutane-4-ol, or mixtures thereof. Optionally, the block copoly(urethane) copolymer can be at least partially comprised of at least one dithioisocyanate.

If the lower softening point material of the block copoly (urethane) copolymer is, e.g., a polyether oligomer or a polyalkylene ether, for example, poly(ethylene oxide), then block copoly(urethane-ethers) result. If the lower softening point material of the block copoly(urethane) copolymer is an ester, for example, a polylactone such as polycaprolactone, then block copoly(urethane-esters) result. Any of the lower softening point materials cited in the description of the block copoly(ester) copolymers above may be used to form a block copoly(urethane) copolymer. Optionally, the lower softening point material of the block copoly(urethane) copolymer may comprise a mixture, for example, a mixture of any of the above-mentioned lower softening point materials. Furthermore, said mixtures of lower softening point materials may be present in a random or block arrangement, or as mixtures thereof.

Preferably, the block copoly(urethane) copolymer TPE is a block copoly(urethane-ester), a block copoly(urethane-ether), or mixtures thereof. Examples of suitable commercially available thermoplastic polyurethanes include the ESTANE® series from the B.F. Goodrich Company, which includes ESTANE® 58133, 58134, 58144 and 58311; the PELLETHANE® series from Dow Chemical, which includes PELLETHANE® 2102-90A and 2103-70A; ELASTOLLAN® from BASF; DESMOPAN® and TEXIN® from Bayer; and Q-THANE® from Morton International.

Block polystyrene TPEs (4) comprise blocks of polystyrene or substituted polystyrene, e.g. poly(-methyl styrene) or poly(4-methyl styrene), (material with the higher softening point) chemically linked or joined to the ends of lower softening point blocks of either a rubber with unsaturation or a saturated rubber. Unsaturated rubber types typically include butadiene, to form styrene-butadiene-styrene (SBS), or isoprene, to form styrene-isoprene-styrene (SIS) block copolymers. Examples of suitable commercially available thermoplastic SBS or SIS copolymers include the KRATON® D series from Shell Chemical, which includes KRATON® D2109, D5119 and D5298; VECTOR® from Dexco; and FINAPRENE® from Fina Oil and Chemical.

Alternatively, the polystyrene blocks of polystyrene TPEs are joined to the ends of substantially saturated rubber blocks. Saturated rubber types typically include butyl rubber or hydrogenated butadiene. The latter styrene-(hydrogenated butadiene)-styrene TPEs, wherein the degree of hydrogenation may be partial or substantially complete, are also known as SEBS. Additionally, copolymers of ethylene and propylene or ethylene and butylene can be chemically linked to polystyrene blocks to form styrene-copolyethylene-styrene (SES). Examples of suitable commercially available thermoplastic SES copolymers include the KRATON® G series from Shell Chemical, which includes KRATON® G2705, G7702, G7715 and G7720; SEPTON® from Kuraray; and C-FLEX® from Concept.

Additionally, block polystyrene TPEs may be functionalized with polar moieties by performing maleic anhydride or sulfonic grafting. Examples of commercially available styrene-block elastomers functionalized by grafting include the KRATON® series from the Shell Corporation, which includes KRATON® FG1901X and FG1921X. Furthermore, block polystyrene TPEs may be functionalized with hydroxy substitution at the polymer chain ends. An example of a commercially available styrene-block elastomer functionalized by hydroxy termination is SEPTON® HG252 from the Mitsubishi Chemical Company.

Preferably, the block polystyrene TPE includes an unsaturated rubber, a functionalized substantially saturated rubber, or mixtures thereof. More preferably, the block polystyrene TPE includes an unsaturated rubber fanctionalized by grafting with maleic anhydride, an unsaturated rubber functionalized by hydroxy termination, a substantially saturated rubber functionalized by grafting with maleic anhydride, a substantially saturated rubber functionalized by hydroxy termination, or mixtures thereof. Most preferably, the block polystyrene TPE includes SBS or SIS functionalized by grafting with maleic anhydride, SEBS or SES functionalized by grafting with maleic anhydride, or mixtures thereof.

Unlike the previous four groups of TPEs, wherein the components are linked chemically, the TEB and the TED groups are commonly prepared by blending a relatively harder thermoplastic and a relatively softer polymer, which functions like an elastomer. Blending is usually accomplished by mechanical mixing of the two polymer types but in situ polymerization or grafting may also be employed. At the completion of blending, the two polymer components form a finely interdispersed multiphase morphology which is optionally linked by covalent chemical bonds. The dispersion is fine enough such that the resulting blend has the mechanical properties and performance typically expected of a TPE. Typically, the harder polymer is the continuous phase since it is usually present in greater quantity. These blended TPEs can be further characterized by whether the softer, elastomeric component is intentionally vulcanized or substantially free of crosslinks.

The TEBs (5) are comprised of thermoplastic and elastomer blends wherein the elastomer is not intentionally crosslinked or vulcanized. The harder polymer component is typically a polyolefin or halogenated polyolefin, preferably including propylene units, or polyvinylchloride. The softer or elastomeric polymer is typically an ethylene-propylenediene monomer terpolymer (EPDM), ethylene-propylene copolymer rubber (EPR) or nitrile rubber. Suitable TEBs include TELCAR® (manufactured by Teknor Apex), which includes TELCAR 302; TPR® (manufactured by Advanced Elastomer Systems); REN-FLEX® (manufactured by Dexter); and POLYTROPE® (manufactured by Schulman).

The second group of thermoplastic and elastomer blends, the TEDVs (6), are comprised of thermoplastic and elastomer or rubber blends wherein the elastomer is intentionally crosslinked or dynamically vulcanized. This terminology arises because, in typical TED blending processes, the elastomer phase is intentionally crosslinked or vulcanized while the melt is subjected to intense shearing fields during blending, in contrast to the quiescent conditions usually present when rubber is vulcanized. The harder polymer component of a TED is typically identical to those used in TEBs. The softer or elastomeric polymer of a TED is usually natural, nitrile or butyl rubber or EPDM. Suitable TEDVs include SANTOPRENE®, VYRAM® and TREFSIN® (manufactured by Advanced Elastomer Systems), which includes SANTOPRENE® 101-73 and 203-40 and TREFSIN® 3201-60; the SARLINK® 2000 and 3000 series from DSM; and TELPRENE® (manufactured by Teknor Apex).

Preferably, the TED includes polypropylene and EPDM; polypropylene and EP rubber; polypropylene, EPDM and EP rubber; or mixtures thereof.

The nonionomer TPE component of this invention has a Shore A hardness of at least about 60 or a Shore D hardness of at least about 20, as measured by ASTM method D-2240. Preferably, the Shore D hardness is from about 20 to about 75, more preferably from about 25 to about 55. The nonionomer TPE component of this invention has a flexural modulus, as measured by ASTM method D-790, of at least about 1,000 psi, preferably from about 1,000 psi to about 150,000 psi, more preferably from about 1,000 psi to about 85,000 psi.

Other Nonionomers

Other nonionomer polymers which can be blended with the polymers of the claimed invention in forming golf ball compositions can be described as nonionomer thermoplastics. In particular, the core and/or layer(s) of the present invention may include a nonionomer thermoplastic polymer which is a thermoplastic or an engineering plastic such as: polycarbonate; polyphenylene oxide; imidized, amino group containing polymers; high impact polystyrene (HIPS); polyether ketone; polysulfone; poly(phenylene sulfide); reinforced engineering plastics; acrylic-styrene-acrylonitrile; poly(tetrafluoroethylene); poly(butyl acrylate); poly(4-cyanobutyl acrylate); poly(2-ethylbutyl acrylate); poly(heptyl acrylate); poly(2-methylbutyl acrylate); poly(3-methylbutyl acrylate); poly(N-octadecylacrylamide); poly(octadecyl methacrylate); poly(4-dodecylstyrene); poly(4-tetradecylstyrene); poly(ethylene oxide); poly(oxymethylene); poly(silazane); poly(furan tetracarboxylic acid diimide); poly(acrylonitrile); poly(-methylstyrene); as well as the classes of polymers to which they belong and their copolymers, including functional comonomers; and blends thereof.

In one embodiment, the nonionomer thermoplastic is poly(ethylene terephthalate) (manufactured as EKTAR® by Eastman Kodak); poly(butylene terephthalate); poly(trimethylene terephthalate) (manufactured by Shell Chemical); poly(vinyl alcohol); poly(vinyl acetate); poly(silane); poly(vinylidene fluoride); acrylonitrile-butadiene-styrene copolymer (ABS); a copolymer consisting essentially of a styrene or an -alkyl styrene monomer and a vinyloxazoline or a 1-alkyl vinyloxazoline monomer, wherein the alkyl groups range, independently, from methyl to decyl inclusive and may be linear or branched; a terpolymer consisting essentially of a styrene or an -alkyl styrene monomer, an alkyl acrylate or an alkyl alkylacrylate monomer, and a vinyloxazoline or a 1-alkyl vinyloxazoline monomer, wherein the alkyl groups range, independently, from methyl to decyl inclusive and may be linear or branched; olefinic polymers; and their copolymers, including functional comonomers; and blends thereof.

In another embodiment, the nonionomer thermoplastic blended with polyamide is an ethylene or propylene based homopolymer or copolymer (including functional monomers such as acrylic and methacrylic acid, such as the ethylene-methyl acrylate or ethylene-butyl acrylate copolymer series manufactured by Quantum Chemical); polymers formed with the use of metallocene catalysts and consisting essentially of a copolymer of ethylene and butene, a copolymer of ethylene and hexene or a copolymer of ethylene and octene; a terpolymer formed with the use of metallocene catalysts and consisting essentially of a polymer of ethylene, propylene and a diene monomer; poly(methyl acrylate); poly(methyl methacrylate); ABS; a polymer including an alkyl acrylate or an alkyl alkylacrylate, wherein each alkyl group ranges, independently, from methyl to decyl inclusive and may be linear or branched; a polymer including an -olefin containing from 2 to 10 carbon atoms; and their copolymers, including functional comonomers; and blends thereof.

If desired, the nonionomer thermoplastic blended with the polyamide includes an impact modifier or a toughened or impact-modified material, such as ABS, or preferably HIPS.

The nonionomer thermoplastic component of this invention has a Shore D hardness of at least about 20, preferably from about 20 to about 75, more preferably from about 25 to about 55, as measured by ASTM method D-2240, and a flexural modulus, as measured by ASTM method D-790, of at least about 1,000 psi, preferably from about 1,000 psi to about 150,000 psi, more preferably from about 1,000 psi to about 85,000 psi.

Metallocene Catalyzed Polymers

As dicussed, the nonionomer thermoplastic polymer may be a nonionomer olefinic polymer, i.e., a nonionomer polymer including an olefin. The olefinic polymers useful in the invention may be polymers formed with the use of metallocene catalyst technology, and, thus, for the purpose of this application these polymers are also referred to as metallocene catalyzed polymers, copolymers, terpolymers and tetrapolymers. Metallocene catalyzed polymers may also comprise functional groups such as epoxy, anhydride, amine, oxazoline, sulfonic acid, carboxylic acid and their salts.

As used herein, the term "olefinic polymer" means a polymer, copolymer, terpolymer or terpolymer comprised of at least one olefin with attached linear or branched alkyl groups having from about 1 to about 18 carbon atoms. The term "olefinic polymer" is specifically meant to include the following materials: a polymer including an -olefin containing from 2 to 10 carbon atoms; polymers formed with the use of metallocene catalysts and including monomers selected from the group consisting of butene, hexene, and octene; polymers formed with the use of metallocene catalysts and selected from the group consisting of a copolymer of ethylene and butene, a copolymer of ethylene and hexene and a copolymer of ethylene and octene; a terpolymer formed with the use of metallocene catalysts and consisting essentially of a polymer of ethylene, propylene, and a diene monomer; copoly(ethylene-vinyl alcohol); a copolymer consisting essentially of an -olefin monomer containing from 2 to 10 carbon atoms and an alkyl acrylate or an alkyl alkylacrylate monomer, wherein each alkyl group ranges, independently, from methyl to decyl inclusive and may be linear or branched; a copolymer consisting essentially of an -olefin monomer containing from 2 to 10 carbon atoms and a glycidyl acrylate or a glycidyl alkylacrylate monomer, wherein the alkyl group ranges from methyl to decyl inclusive and may be linear or branched; a terpolymer consisting essentially of an -olefin monomer containing from 2 to 10 carbon atoms, an alkyl acrylate or an alkyl alkylacrylate monomer, and a glycidyl acrylate or a glycidyl alkylacrylate monomer, wherein each alkyl group ranges, independently, from methyl to decyl inclusive and may be linear or branched; a copolymer consisting essentially of an -olefin monomer containing from 2 to 10 carbon atoms and a vinyloxazoline or 1-alkyl vinyloxazoline monomer, wherein the alkyl group ranges from methyl to decyl inclusive and may be linear or branched; a terpolymer consisting essentially of an -olefin monomer containing from 2 to 10 carbon atoms, an alkyl acrylate or an alkyl alkylacrylate monomer, and a vinyloxazoline or 1-alkyl vinyloxazoline monomer, wherein each alkyl group ranges, independently, from methyl to decyl inclusive and may be linear or branched; a copolymer consisting essentially of an -olefin monomer containing from 2 to 10 carbon atoms and carbon monoxide; a terpolymer consisting essentially of a first -olefin monomer containing from 2 to 10 carbon atoms, a second -olefin monomer containing from 2 to 10 carbon atoms, and carbon monoxide; a copolymer consisting essentially of an -olefin monomer containing from 2 to 10 carbon atoms and sulfur dioxide; a terpolymer consisting essentially of a first -olefin monomer containing from 2 to 10 carbon atoms, a second -olefin monomer containing from 2 to 10 carbon atoms, and sulfur dioxide; a copolymer consisting essentially of an -olefin monomer containing from 2 to 10 carbon atoms and maleic anhydride; a terpolymer consisting essentially of an -olefin monomer containing from 2 to 10 carbon atoms, maleic anhydride, and carbon monoxide; a terpolymer consisting essentially of an -olefin monomer containing from 2 to 10 carbon atoms, maleic anhydride, and sulfur dioxide; and a terpolymer consisting essentially of an -olefin monomer containing from 2 to 10 carbon atoms, maleic anhydride, and an alkyl acrylate or an alkyl alkylacrylate monomer, wherein each alkyl group ranges, independently, from methyl to decyl inclusive and may be linear or branched. Furthermore, the term "olefinic polymers" also encompasses mixtures of at least two olefinic polymers.

As used herein, the term "metallocene catalyst" refers to a single-site catalyst wherein the ancillary ligands include substituted or unsubstituted cyclopentadienyl groups. As used herein, the term "metallocene catalyzed polymer" refers to any polymer, copolymer, or terpolymer, and, in particular, any polyolefin, polymerized using a metallocene catalyst. The term "metallocene catalyzed polymer blend" refers to any blend of a metallocene catalyzed polymer and any other type of polymer, preferably an ionomer.

As used herein, the phrase "linear or branched alkyl groups of up to about 18 carbon atoms" means any substituted or unsubstituted acyclic carbon-containing compound, including alkanes, alkenes and alkynes. As used herein, the phrase "alkyl group ranges from methyl to decyl inclusive and may be linear or branched" means any substituted or unsubstituted acyclic carbon-containing compounds, including alkanes, alkenes and alkynes.

Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, butyldiene, pentene, hexene, heptene, octene, norbornene, nonene, decene and the like. The ordinary skilled artisan is familiar with numerous linear and branched alkyl groups, which are within the scope of the present invention.

Additionally, such alkyl groups may also contain various substituents in which one or more hydrogen atoms has been replaced by a functional group. Functional groups include but are not limited to hydroxyl, amino, epoxy, carboxyl, sulfonic amide, ester, ether, phosphates, thiol, nitro, silane and halogen (fluorine, chlorine, bromine and iodine), to mention but a few.

The copolymers formed with the use of metallocene catalysts useful in the present invention are commercially available under the trade name AFFINITY® polyolefin plastomers and ENGAGE® polyolefin elastomers by DuPont-Dow Elastomers Company and they are described more fully in U.S. Pat. Nos. 5,272,236 and 5,278,272, the disclosures of which are incorporated in their entirety by reference herein. Other commercially available polymers formed with the use of metallocene catalysts can be used, such as Exxon Chemical Company's EXACT® and Dow Chemical's INSIGHT® lines of resins, which have superior flexibility and clarity as well as toughness. The EXACT® and INSIGHT® lines of polymers also have novel rheological behavior in addition to their other properties as a result of using a metallocene catalyst technology. The method of making EXACT® and INSIGHT® polymers and their compositions are more fully detailed in U.S. Pat. Nos. 5,359,015 and 5,281,679, the entire disclosures of which are incorporated herein by reference. Metallocene catalyzed polymers are also available from Sentinel Products Corporation of Hyannis, Mass., as foamed sheets for compression molding. The foamed grafted metallocene catalyzed polymers sheets are available in thicknesses ranging from about 0.027 inches to 0.625 inches (0.069 cm to 0.159 cm). Closed cell bun stock is also available in thicknesses of up to 4 inches (10.2 cm).

Any of the olefinic polymers may also be functionalized by grafting with, e.g., maleic anhydride. Examples of metallocene catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene, and most preferably, butene, pentene, hexene, heptene, octene, and norbornene. Generally, the invention includes golf balls having at least one layer including at least one grafted metallocene catalyzed polymer or polymer blend, where the grafted metallocene catalyzed polymer is produced by grafting a functional group onto a metallocene catalyzed polymer having the formula:

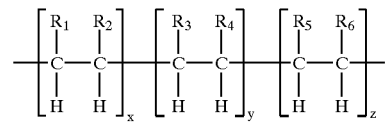

wherein $R_1$ is hydrogen, linear or branched alkyl such as methyl, ethyl, propyl, butyl, pentyl, hexyl, heptyl, and octyl, carbocyclic, aromatic or heterocyclic;

$R_2$ is hydrogen, lower alkyl including $C_1$–$C_5$; carbocyclic, aromatic or heterocyclic $R_3$ is hydrogen, lower alkyl including $C_1$–$C_5$, carbocyclic, aromatic or heterocyclic;

$R_4$ is selected from the group consisting of H, CnH2n+1, where n=1 to 18, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

R6 is hydrogen, lower alkyl including $C_1$–$C_5$, carbocyclic, aromatic or heterocyclic; and wherein x, y and z are the relative percentages of each co-monomer. The number x can range from 1 percent to 99 percent or more preferably from 10 percent to 70 percent and most preferred, from about 10 percent to about 50 percent. The number y can be from 99 percent to 1 percent, preferably, from 90 percent to 30 percent, or most preferably, 90 percent to 50 percent. The number z can range from 0 percent to 49 percent.

Preferably, the preferred grafted metallocene catalyzed polymer is formed by grafting a functional group onto a metallocene catalyzed polyethylene or a metallocene catalyzed polymer of the formula given above in which $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

Metallocene catalyzed copolymers or terpolymers can be random or block copolymers or terpolymers, and may be isotactic, syndotactic or atactic. The pendant groups creating the isotactic, syndiotactic or atactic polymers are chosen to determine the interactions between the different polymer chains making up the resin to control the final properties of the resins used in golf ball cover, core, or intermediate layers. As will be clear to those skilled in the art, grafted metallocene catalyzed polymers useful in the invention that are formed from metallocene catalyzed random or block copolymers or terpolymers will also be random or block copolymers or terpolymers, and will have the same tacticity of the metallocene catalyzed polymer backbone.

As used herein, substituted and unsubstituted carbocyclic means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, substituted and unsubstituted aryl groups means a hydrocarbon ring bearing a system of conjugated double bonds, typically including 4n+2☐ (pi) ring electrons, where n is an integer. Examples of aryl groups include, but are not limited to phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

Grafted metallocene catalyzed polymers, functionalized with pendant groups, such as maleic anhydride, and the like, are available in experimental quantities from DuPont. Grafted metallocene catalyzed polymers may also be obtained by subjecting a commercially available non-grafted metallocene catalyzed polymer to a post-polymerization reaction involving a monomer and an organic peroxide to provide a grafted metallocene catalyzed polymer with the desired pendant group or groups.

Monomers useful in the present invention include, but are not limited to olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester derivatized mono-carboxylic acids and dicarboxylic acids, and anhydrides of dicarboxylic acids, and cyclic imides of dicarboxylic acids. In polyethylene, the post-polymerization reaction results in the substitution of the monomer for a hydrogen on the polymer backbone. Because all of the secondary hydrogen atoms are equivalent in polyethylene, the pendant group may replace any of the secondary hydrogens on the polymer. In copolymers and polymers of olefins other than ethylene, which contain both secondary and tertiary hydrogens, the tertiary hydrogens are more labile, and, thus, the reaction occurs substantially exclusively at the site of the tertiary hydrogens.

In addition, metallocene catalyzed polymers may also be functionalized by sulfonation, carboxylation, or the addition of an amine or hydroxy group. Metallocene catalyzed polymers functionalized by sulfonation, carboxylation, or the addition of a hydroxy group may be converted to anionic ionomers by treatment with a base. Similarly, metallocene catalyzed polymers functionalized by the addition of an amine may be converted to cationic ionomers by treatment with an alkyl halide, acid, or acid derivative.

In one embodiment, the monomer used is maleic anhydride, which, once attached to the metallocene catalyzed polymer by the post-polymerization reaction, may be further subjected to any reaction to which an anhydride may be subject to form a grafted metallocene catalyzed polymer containing other pendant or functional groups. For example, reaction with water will convert the anhydride to a dicarboxylic acid, reaction with ammonia forms an amide, reaction with an alcohol results in the formation of an ester, and reaction with base results in the formation of an anionic ionomer.

In particular, maleic anhydride, which has the formula:

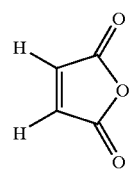

may be grafted onto a metallocene-catalyzed polymer by means of a post-polymerization reaction, as described above. The maleic anhydride will graft onto a metallocene catalyzed polymer of formula:

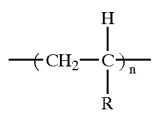

to form a grafted metallocene catalyzed polymer of formula:

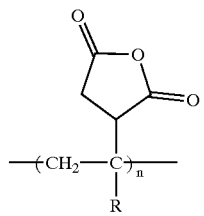

where R is not H, the monomer being grafted to the metallocene catalyzed polymer will always replace the tertiary H because the tertiary H is more labile than the secondary H. Clearly, in polyethylene, where every H is a secondary H, the monomer must replace a secondary H. Where the monomer is a maleic anhydride, the resulting grafted metallocene catalyzed polymer may be reacted with water to form:

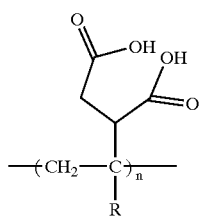

which may be further reacted with a base of formula $M^+OH^-$ to form an ionomer of any of three formulas below:

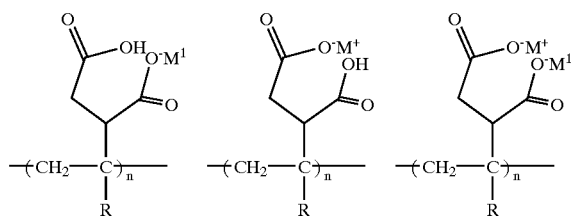

or reacted with a base of formula $M_2^+(OH^-)_2$ to form an ionomer of formula:

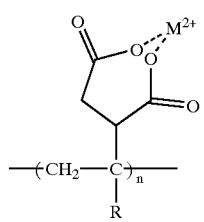

A maleic anhydride grafted metallocene catalyzed polymer may also be reacted with ammonia to form:

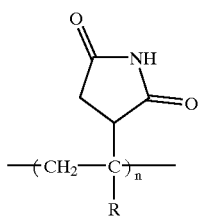

It has been discovered that maleic anhydride grafted metallocene catalyzed polymers are formed of highly compatible blends with ionomers and other thermoplastic polymers.

In addition, unsaturated carboxylic acids, such as methacrylic and acrylic acid, can be grafted to a metallocene catalyzed polymer to form:

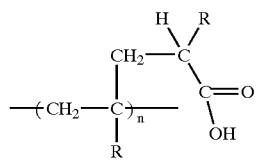

which may be reacted with a base to form an ionomer. Sulfur compounds, such as $H_2SO_4$, $ClSO_3H$, or $SO_3$, when grafted to a metallocene catalyzed polymer will form polymers of formula:

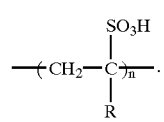

Grafting a vinyl ester of formula CH2=CH—COOR gives polymers of formula:

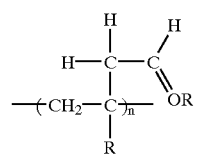

and a primary or secondary amine or other suitable nitrogen compound provides polymers of formula:

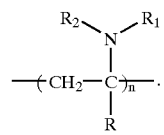

If a monomer of formula:

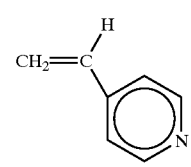

is used, the resulting grafted metallocene catalyzed polymer of formula

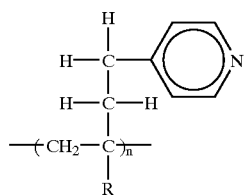

may be reacted with an acid or acid derivative or a compound of formula $R^+X^-$, where R may be a linear or branched alkyl group having from 1 to 12 carbon atoms, and X may be a halide, to form a cationic ionomer.

Blended Compositions

The blended compositions of the present invention include polyamide homopolymers and/or polyamide copolymers, such as nylons and/or nylon copolymers, as discussed above.

In one embodiment, polyamide homopolymers, such as polyamide 6,18 and polyamide 6,36 are used alone, or in combination with other polyamide homopolymers. In another embodiment, polyamide copolymers, such as polyamide 6,10/6,36, are used alone, or in combination with other polyamide copolymers. Other examples of suitable polyamide homopolymers and copolymers include polyamide 6, polyamide 11, polyamide 12, polyamide 4,6, polyamide 6,6, polyamide 6,9, polyamide 6,10, polyamide 6,12, polyamide 6/6,6, polyamide 6,6/6,10, polyamide 6/6,T, polyamide 6/6, 6/6,10, polyamide 66,6,18, polyamide 66,6,36, polyamide 6/6,18, polyamide 6/6,36, polyamide 6/6,10/6,18, polyamide 6/6,10/6,36, polyamide 6,10/6,18, polyamide 6,12/6, 18, polyamide 6,12/6,36, polyamide 6/66/6,18, polyamide 6/66/6,36, polyamide 66/6,10/6,18, polyamide 66/6,10/6,36, polyamide 6/6,12/6,18, polyamide 6/6,12/6,36.

In yet another embodiment, polyamide homopolymers and polyamide copolymers are blended. Such blends include about 99 weight percent to about 1 weight percent polyamide homopolymer, e.g., polyamide 12, and about 1 weight percent to about 99 weight percent polyamide copolymer, e.g., polyamide 6,10/6,36. Preferably, the blend includes about 5 weight percent to about 95 weight percent polyamide homopolymer and about 95 weight percent to about 5 weight percent polyamide copolymer. In one embodiment, the blend includes about 10 weight percent to about 85 weight percent polyamide homopolymer and about 90 weight percent to about 15 weight percent polyamide copolymer. In another embodiment, the blend includes about 25 weight percent to about 85 weight percent polyamide homopolymer and about 75 weight percent to about 15 weight percent polyamide copolymer. In yet another embodiment, the blend includes about 45 weight percent to about 75 weight percent polyamide homopolymer and about 55 weight percent to about 25 weight percent polyamide copolymer. In yet another embodiment, the blend includes about 50 weight percent polyamide homopolymer and about 50 weight percent polyamide copolymer.

Polyamide-Nonionomer Blends

Any of the above polyamide homopolymer, copolymer, and homopolymer/copolymer blends may be optionally blended with nonionomer polymers, such as nonionomer thermoplastic polymers, nonionomer thermoplastic copolymers, nonionomer TPEs, and mixtures of nonionomers discussed above.

Such blends may include about 1 weight percent to about 99 weight percent polyamide and about 99 weight percent and about 1 weight percent nonionomer polymer. Preferably, the blend includes about 5 weight percent to about 95 weight percent polyamide and about 95 weight percent to about 5 weight percent nonionomer polymer. In one embodiment, the blend includes about 10 weight percent to about 85 weight percent polyamide and about 90 weight percent to about 15 weight percent nonionomer polymer. In another embodiment, the blend includes about 25 weight percent to about 85 weight percent polyamide and about 75 weight percent to about 15 weight percent nonionomer polymer. In yet another embodiment, the blend includes about 45 weight percent to about 75 weight percent polyamide and about 55 weight percent to about 25 weight percent nonionomer polymer.

The at least one polyamide polymer is combined with at least one nonionomer polymer according to methods well known in the art for combining materials for use in golf ball compositions. In particular, the polyamide polymers of the invention may be combined with any other nonionomer TPE polymer or nonionomer thermoplastic polymer that is or can be used in golf ball covers. As used herein, a nonionomer thermoplastic polymer is exclusive of a nonionomer thermoplastic elastomer (TPE) polymer in that, as one of ordinary skill in the art would recognize, a nonionomer thermoplastic elastomer polymer exhibits the typical mechanical response, not of a thermoplastic, but of an elastomer. For example, a nonionomer thermoplastic elastomer polymer should stretch rapidly and considerably under tension, reach high elongations with low damping, i.e., little loss of energy as heat, and should retract rapidly from high elongations, exhibiting the phenomenon of snap or rebound.

One specific example of a polyamide-nonionomer blend is a polyamide-metallocene catalyzed polymer blend. The blended compositions may include grafted and/or non-grafted metallocene catalyzed polymers. In one embodiment, about 99 weight percent to about 1 weight percent polyamide and about 1 weight percent to about weight 99 percent metallocene catalyed polymer is present in the composition. In another embodiment, about 90 weight percent to about 10 weight percent polyamide and about 10 weight percent to about 90 weight percent metallocene catalyed polymer is present in the composition. In another embodiment, about 85 weight percent polyamide and about 15 weight percent metallocene catalyzed polymer is present. In yet another embodiment, about 70 weight percent polyamide and about 30 weight percent metallocene catalyzed polymer is present in a blend. In yet another embodiment, about 55 weight percent polyamide and about 45 weight percent metallocene catalyzed polymer is present in a blend.

Another example of a polyamide-nonionomer blend is a polyamide and non-ionic polymers produced using non-metallocene single-site catalysts. As used herein, the term "non-metallocene catalyst" or non-metallocene single-site catalyst" refers to a single-site catalyst other than a metallocene catalyst.

Examples of suitable single-site catalyzed polymers are disclosed in co-pending U.S. patent application Ser. No. 09/677,871, of which the entire disclosure is incorporated by reference herein. The single-site catalyzed polymers may be foamed or unfoamed, grafted or non-grafted. In one embodiment, the single-site catalyzed polymer has the formula:

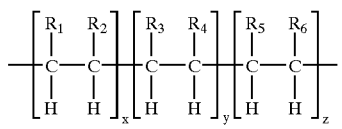

wherein
- $R_1$ is hydrogen;
- $R_2$ is hydrogen or lower alkyl selected from the group consisting of $CH_3$, $C_2H_5$, $C_3H_7$, $C_4H9$, and $C_5H_{11}$;
- $R_3$ is hydrogen or lower alkyl selected from the group consisting of $CH_3$, $C_2H_5$, $C_3H_7$, $C_4H9$, and $C_5H_{11}$;
- $R_4$ is selected from the group consisting of H, $CH_3$, $C_2H_5$, $C_3H_7$, $C_4H_9$, and $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, epoxy, isocyanate, silicone, lower alkyl esters and lower alkyl ethers, with the proviso that $R_3$ and $R_4$ can be combined to form a bicyclic ring;
- $R_5$ is hydrogen, lower alkyl including $C_1$–$C_5$, carbocyclic, aromatic or heterocyclic;
- $R_6$ is hydrogen, lower alkyl including $C_1$–$C_5$, carbocyclic, aromatic or heterocyclic;

and wherein x ranges from about 100 weight percent to about 50 weight percent of the polymer, y ranges from 0 to about 50 weight percent of the polymer and z ranges from 0 to about 49 weight percent.

In one embodiment, single-site catalyzed polymers are grafted prior to blending with the polyamides and polyamide blends described above. Grafted single-site catalyzed polymers share the advantages of non-grafted single-site catalyzed polymers, including a narrow molecular weight distribution and uniform molecular architecture. The addition of functional groups to the single-site catalyzed polymers by grafting allows polymers to be produced having properties that are not available with unfunctionalized single-site catalyzed polymers or polymers formed without the use of single-site catalysts.

Preferably, the grafted single-site catalyzed polymer is formed by grafting an ethylenically unsaturated monomer onto a single-site catalyzed polymer selected from the group consisting of polyethylene, polypropylene, and copolymers of ethylene with propylene, butene, pentene, hexene, heptene, octene, and norbornene. In one embodiment, copolymers of ethylene with butene, pentene, hexene, heptene, octene, and norbornene are used for grafting. In addition, single-site catalyzed polymers may also be functionalized by sulfonation, carboxylation, or by the addition of an amine or hydroxy group.

In one embodiment, about 99 weight percent to about 1 weight percent polyamide and about 1 weight percent to about weight 99 percent metallocene catalyed polymer is present in the composition. In another embodiment, about 90 weight percent to about 10 weight percent polyamide and about 10 weight percent to about weight 90 percent metallocene catalyed polymer is present in the composition. In another embodiment, about 85 weight percent polyamide and about 15 weight percent grafted or non-grafted non-metallocene single-site catalyzed polymer is present. In yet another embodiment, about 70 weight percent polyamide and about 30 weight percent grafted or non-grafted non-metallocene single-site catalyzed polymer is present in a blend. In yet another embodiment, about 55 weight percent polyamide and about 45 weight percent grafted or non-grafted non-metallocene single-site catalyzed polymer is present in a blend.

The polyamide and nonionomer blends may be used in any layer of the golf ball, preferably a cover layer, and more preferably, an inner cover layer or intermediate layer of a golf ball.

Polyamide-Ionomer Blends

Polyamides may also be blended with ionomers, such as copolymers of ethylene and methacrylic acids partially or filly neutralized with metal ions, to form various layers of a golf ball. In one embodiment, the ionomers used in the blend consist of a copolymer of a mono-olefin, e.g., an alkene, with at least one other type of comonomer selected from the group consisting of unsaturated mono- or di-carboxylic acids having 3 to 12 carbon atoms and esters thereof (the polymer contains about 1 to about 50 by weight of the unsaturated mono- or di-carboxylic acid and/or ester thereof) with from about 1 percent to about 100 percent of the carboxylic acid groups neutralized by a metal ion. More particularly, such acid-containing ethylene copolymer ionomers include E/X/Y copolymers where E is ethylene, X is a softening comonomer such as acrylate or methacrylate present in an amount of from 0 to about 50 weight percent of the polymer, and Y is acrylic or methacrylic acid present in an amount from about 5 weight percent to about 35 weight percent of the polymer, wherein the acid moiety is neutralized from about 1 percent to about 100 percent to form an ionomer by a cation such as lithium, sodium, potassium, magnesium, calcium, barium, lead, tin, zinc or aluminum, or a combination of such cations.

Such blends may include about 1 weight percent to about 99 weight percent polyamide and about 99 weight percent and about 1 weight percent ionomer. Preferably, the blend includes about 5 weight percent to about 95 weight percent polyamide and about 95 weight percent to about 5 weight percent ionomer. In one embodiment, the blend includes about 10 weight percent to about 85 weight percent polyamide and about 90 weight percent to about 15 weight percent ionomer. In another embodiment, the blend includes about 25 weight percent to about 85 weight percent polyamide and about 75 weight percent to about 15 weight percent ionomer polymer. In yet another embodiment, the blend includes about 45 weight percent to about 75 weight percent polyamide and about 55 weight percent to about 25 weight percent ionomer.

In one embodiment, about 50 percent polyamide and about 50 percent ionomer are present in an inner cover or intermediate layer blend. In another embodiment, about 50 percent polyamide, about 25 percent Zn ionomer, and about 25 percent Li ionomer are present in an inner cover blend. In yet another embodiment, about 20 percent polyamide and about 80 percent Zn ionomer are present in an inner cover or intermediate layer blend. The ionomer may be partially or fully neutralized.

Grafted Metallocene Catalyzed Polymer-Ionomer Blends

The blended compositions may also include a mixture of grafted metallocene catalyzed polymers and ionomers. In one embodiment, grafted metallocene catalyzed polymers are blended with ionomers, such as ethylene methacrylic acid ionomers, and ethylene acrylic acid ionomers, and their terpolymers, sold commercially under the trade names SURLYN® and IOTEK® by DuPont and Exxon respectively.

Blends of this embodiment may include about 1 phr to about 100 phr of at least one grafted metallocene catalyzed polymer and about 99 phr to 0 phr of at least one ionomer, preferably from about 5 phr to about 90 phr of at least one grafted metallocene catalyzed polymer and about 95 phr to about 10 phr of at least one ionomer, more preferably from about 10 phr to about 75 phr of at least one grafted metallocene catalyzed polymer and about 90 phr to about 25 phr of at least one ionomer, and most preferably from about 10 phr to about 50 phr of at least one grafted metallocene catalyzed polymer and about 90 phr to about 50 phr of at least one ionomer. Where the layer is foamed, the grafted metallocene catalyzed polymer blends may be foamed during molding by any conventional foaming or blowing agent.

Grafted Metallocene Catalyzed Polymer-Other Polymer Blends

The grafted metallocene catalyzed polymers useful in the golf balls of the invention can also be blended with non-grafted metallocene catalyzed polymers and other non-ionomeric polymers, such as poly(ethylethylene), poly (heptylethylene), poly(hexyldecylethylene), poly (isopentylethylene), poly(1,1-dimethyltrimethylene), poly (1,1,2-trimethyltrimethylene), poly(butyl acrylate), poly(4-cyanobutyl acrylate), poly(2-ethylbutyl acrylate), poly (heptyl acrylate), poly(2-methylbutyl acrylate), poly(3-methylbutyl acrylate), poly(N-octadecylacrylamide), poly (octadecyl methacrylate), poly(butoxyethylene), poly[1,1-bis(trifluoromethoxy)difluoroethylene], poly (methoxyethylene), poly(pentyloxyethylene), poly(1,1-dichloroethylene), poly(cyclopentylacetoxyethylene), poly (4-[(2-butoxyethoxy)methyl]styrene), poly(4-dodecylstyrene), poly(4-tetradecylstyrene), poly (phenetylmethylethylene), poly[oxy(allyloxymethyl) ethylene], poly[oxy(ethoxymethyl)ethylene], poly (oxyethylethylene), poly(oxytetramethylene), poly (oxytrimethylene), poly(oxycarbonylpentamethylene), poly (oxycarbonyl-3-methylpentamethylene), poly(oxycarbonyl-1,5-dimethylpentamethylene), poly(oxy-2,2,3,3,4,4-hexafluoropentamethyleneoxyadipoyl), poly[oxy(methyl)-3,3,3-trifluoropropylsilylene-3p3-difluoropentamethylene (methyl)-3,3,3-tri fluoropropylsilylene], poly(silanes) and poly(silazanes), main-chain heterocyclic polymers, polyimides, polyesters, polyethers, polycarbonates, and poly (furan tetracarboxylic acid diimides) as well as the classes of polymers to which they belong.

Additional Materials

Additional materials conventionally included in golf ball compositions may be added to the compositions of the invention to enhance the formation of golf ball covers. These additional materials include, but are not limited to, coloring agents, reaction enhancers, crosslinking agents, whitening agents, UV absorbers, processing aids, density-adjusting fillers such as metal flakes, metal powders and mixtures thereof, and other conventional additives. Antioxidants, stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

For example, the compositions of the invention can be reinforced by blending with a wide range of density-adjusting fillers, e.g., glass fibers, inorganic particles, and metal particles, such as metallic powders, oxides, and derivatives thereof, as is known to those with skill in the art.

Compatibilizers

As used herein, the term "compatible" with regard to a polymer blend refers to a blend of two or more polymers, having useful golf ball properties, that is homogeneous on a macroscopic scale. Compatible blends may be miscible, i.e., homogeneous on a microscopic scale, or at least partially immiscible, i.e., heterogeneous on a microscopic scale. The term "incompatible" refers to a mixture of at least two polymers that is heterogeneous on both a microscopic scale and a macroscopic scale, such that useful golf ball properties, such as durability, are lacking. When the compositions of the invention have no added compatibilizing component, this condition is therefore defined and referred to herein as being "substantially compatibilizer-free."

When the compositions of the invention have no added optical brightener component, this condition is therefore defined and referred to herein as being "substantially optical brightener-free." lends of one or more polyamides or one or more polyamide copolymers may be used in forming compositions according the present invention.

Blowing or Foaming Agents

A physical or chemical blowing or foaming agent may be included in the compositions of the present invention to produce a foamed layer. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful.

Nucleating Agents

Nucleating agents may optionally be added to the polyamide component or to a blend including polyamide. They are thought to be able to beneficially alter the properties of a polyamide component which is not amorphous by changing its semicrystalline nature, such as its degree of crystallinity and the distribution of crystallite sizes. A nucleating agent typically leads to greater uniformity in the rate of crystal growth and in the size, number and type of crystals formed from the molten polyamide. The more uniform crystalline texture produced by the added nucleating agent may result in increased flexural modulus and hardness. Nucleating agents such as finely dispersed silicas may be added in typical amounts, as is known to those with skill in the art.

Blend Preparation

The polymer blends of this invention can be prepared with blend components of varying molecular architecture, which is further demonstrated in the appended examples. Examples of the parameters which may be varied include molecular weight, molecular weight distribution, tacticity and, optionally, branching, degrees and arrangements of blockiness, block molecular weight and block molecular weight distribution, as is well known to those knowledgeable in the art of blending polymers.

The blends of the invention are formed by combining the polymer components by methods familiar to those in the polymer blending art, for example, with a two roll mill, a Banbury mixer or a single or twin-screw extruder. The single screw extruder may optionally have a grooved barrel wall, comprise a barrier screw or be of a shortened screw design. The twin screw extruder may be of the counter-rotating non-intermeshing, co-rotating non-intermeshing, counter-rotating fully intermeshing or co-rotating fully intermeshing type. Preferably, the normally higher-melting polyamide component is first melted in the main extruder and the molten nonionomer component is introduced as a sidestream into a main extruder conveying molten polyamide where the two melts are intermixed to form a blend.

For example, grafted metallocene catalyzed polymers and polymer blends may be thermoformed, and, thus, can be either compression or injection molded to form a layer of foamed or unfoamed grafted metallocene catalyzed polymer in the cover, core, or mantle of a golf ball according to the invention. Grafted metallocene catalyzed polymers and grafted metallocene catalyzed polymer blends are resilient, easily processed materials that are less expensive than ionomers, and allow highly durable golf balls to be produced with improved performance and virtually any combination of feel and spin rate.

Blending of the grafted metallocene catalyzed polymer and ionomer resins is accomplished in a conventional manner using conventional equipment. Good results have been obtained by mixing the grafted metallocene catalyzed polymer and ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable grafted metallocene catalyzed polymer blend using a retractable-pin mold. Such machines are conventional.

Golf Ball Construction

Conventional equipment used in the production of golf balls may be used to form the golf balls of the invention in a manner well known to those skilled in the art. For example, golf balls including the cover compositions of the invention can be made by injection molding cover stock formed from a polyamide-nonionomer blend of the invention around a core or by compression molding pre-formed half-shells of the cover stock into a ball mold in a conventional manner. Furthermore, golf ball intermediate layers including the intermediate layer compositions of the invention can be made by injection molding intermediate layer stock formed from a polyamide-nonionomer blend of the invention around a core or by compression molding pre-formed half-shells of the intermediate layer stock into a ball mold in a conventional manner, then covered by a layer including cover stock as described above, to form a multilayer golf ball.

After molding, golf balls including the golf ball compositions of the invention can be finished by buffing, painting, and stamping.

The compositions of the invention can be used in the formation of various golf ball components for multilayer balls. The compositions of this invention can also be used to form unitary or one-piece golf balls. Additionally, they can be used to form golf ball cores for two piece or multilayer balls. For example, the compositions of the invention may be used in a dual core golf ball with an intermediate layer and a cover layer, a dual core golf ball with thin dual cover layers, and a large core golf ball with thin inner and outer cover layers. In one embodiment, the composition of the invention is used to form a thin casing or inner cover layer over a core, and a thin outer cover layer is disposed thereon. In another embodiment, the composition of the invention is used to form a thin casing or inner cover layer over a dual core, and a thin outer cover layer is formed thereon.

As used herein, an "intermediate layer" is any layer between an outermost cover and an innermost core. Such an intermediate layer may be distinguished from a cover or a core by some difference in the materials comprising the layers. An intermediate layer may, for example, have a distinct composition, a different proportion of components, a different molecular weight of a component, a different molecular weight distribution of a component, or a different degree of curing or crosslinking when compared to the corresponding attribute of the component comprising the cover or core layers. Moreover, a "cover" or a "core" as these terms are used herein may include a single layer or a plurality of layers. An intermediate layer may be used, if desired, with a dual or a multilayer cover or a dual or a multilayer core, or with both a multilayer cover and a multilayer core. Therefore, an intermediate layer is also sometimes referred to in the art as an inner cover layer, as an outer core layer, or as a mantle layer.

In one embodiment, the compositions disclosed can be used to form at least one intermediate and/or inner cover layer of a golf ball. For example, the compositions of the invention may be used in an intermediate layer of a golf ball with a thin outer cover layer disposed thereon.

In one embodiment, an intermediate layer, or an inner cover, in a golf ball constructed according to the invention can be about 1 weight percent to about 100 weight percent polyamide. In this embodiment, the cover includes a nonionomer polymer material, an ionomer, or mixtures thereof. The nonionomer polymer material may be a nonionomer thermoplastic polymer or a nonionomer TPE polymer as has been previously described, including a functionalized polymer, a copolymer or a functionalized copolymer, or mixtures thereof, or a thermoset polymer, including a functionalized thermoset polymer, a thermoset copolymer or a functionalized thermoset copolymer, or mixtures thereof. For the purposes of this application, a thermoset polymer includes, but is not limited to: poly(isoprene), both natural and synthetic; poly(butadiene); poly(chloroprene); poly (urethane); poly(siloxane); styrene-butadiene rubber; EPDM rubber; nitrile rubber; butyl rubber; chlorotrifluoroethylene copolymer rubber; vinylidene fluoride-hexafluoropropylene copolymer rubber; polysulfide rubber; epichlorohydrin rubber; poly(urea); poly(ester); phenolic resin; epoxy resin; and any nonionomer thermoplastic polymer which may be crosslinked.

In another embodiment, when an intermediate layer in a golf ball constructed according to the invention includes polyamide, the cover may include an ionomer including at least one material selected from the group consisting of: polyolefin, polyester, polystyrene, SBS, SEBS and polyurethane, in the form of a homopolymer, a copolymer or a block copolymer ionomer.

In yet another embodiment, when an intermediate layer in a golf ball constructed according to the invention includes polyamide, the cover may include an ionomer or a functionalized ionomer, a copolymer ionomer or a functionalized copolymer ionomer, or mixtures thereof, that include, but is not limited to: polyolefin, polyester, copoly(ether-ester), copoly(ester-ester), polyamide, polyether, polyurethane, polyacrylate, polystyrene, SBS, SEBS, and polycarbonate, in the form of a homopolymer, a copolymer or a block copolymer ionomer. In one embodiment, the ionomer comprises a copolymer of an olefin and an α,β-ethylenically unsaturated carboxylic acid, wherein at least a portion of the carboxylic acid groups are neutralized with a metal ion. In another embodiment, the carboxylic acid groups are neutralized to about 10 to about 100 percent with a metal ion. The metal ions may include zinc, sodium, lithium, among others described above.

In yet another embodiment, when an intermediate layer in a golf ball constructed according to the invention includes polyamide, the cover includes a nonionomer polymer material including at least one material selected from the group consisting of: nonionic olefinic homopolymers and copolymers; polyamide; poly(methyl acrylate); poly(methyl methacrylate); ABS; poly(urethane); poly(urea); poly (isoprene); and poly(butadiene).

In still another embodiment, when an intermediate layer in a golf ball constructed according to the invention includes polyamide, the cover includes at least one material selected from the group consisting of: nonionic olefinic polymers; polyamide; polyolefin ionomers; SBS ionomers; SEBS ionomers; poly(isoprene); poly(butadiene); a thermoset poly (urethane) such as those described by U.S. Pat. No. 5,334, 673, the contents of which are incorporated herein in their entirety; and a thermoset poly(urea) such as those described by U.S. Pat. No. 5,484,870, the contents of which are incorporated herein in their entirety.

In one embodiment, a golf ball has at least one foamed or unfoamed layer that includes one or more grafted metallocene catalyzed polymers. The layer may be in any of the core, the cover, or an intermediate layer disposed between the cover and the core. The grafted metallocene catalyzed polymer may be blended with other types of polymers, such as non-grafted metallocene catalyzed polymers, ionomers, and thermoplastic elastomers. Preferably, the grafted metallocene catalyzed polymer is blended with at least one ionomer.

Cores including at least one grafted metallocene catalyzed polymer or polymer blend may be either one-piece, including a single piece of foamed or unfoamed grafted metallocene catalyzed polymer or polymer blend, or multi-piece, including a liquid or solid core or center and one or more layers in which any of the center or at least one of the layers includes a foamed or unfoamed grafted metallocene catalyzed polymer or polymer blend.

For example, FIG. 1 illustrates a golf ball according to the invention with a one-piece core. Golf ball 1 includes a core 2 and a cover 3, wherein either of core 2 or cover 3 ncorporates at least one layer including a foamed or unfoamed grafted metallocene catalyzed blend.

Figure 2:
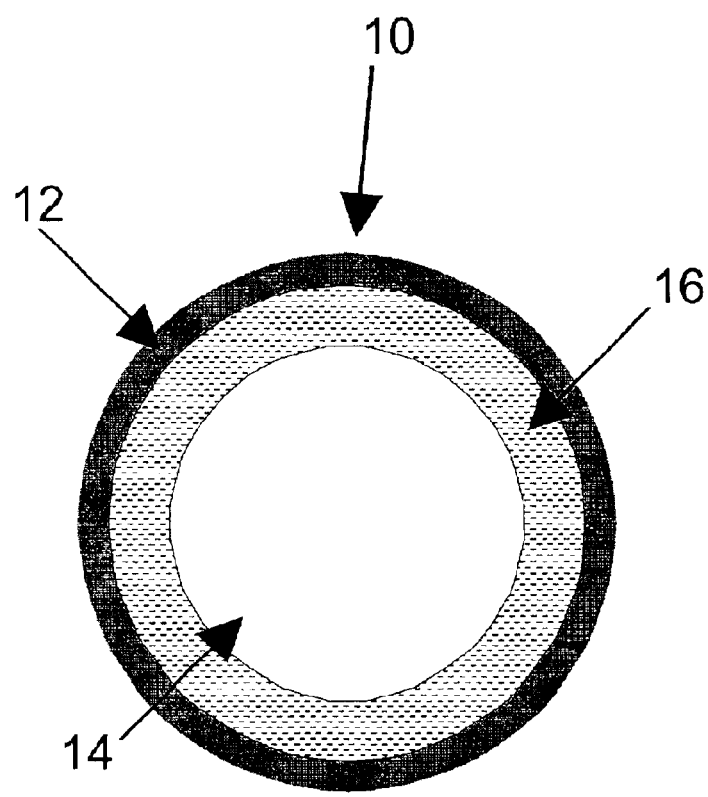
FIG. 2 is a cross-sectional view of a golf ball according to the invention incorporating a multi-layer core.

Similarly, FIG. 2 illustrates a golf ball according to the invention incorporating a multilayer core. Golf ball 10 includes a cover 12, a core having a center 14 and at least one additional core layer 16. Any of the cover 12, center 14, or core layer 16 may incorporate at least one layer of a foamed or unfoamed grafted metallocene catalyzed blend.

Figure 3:
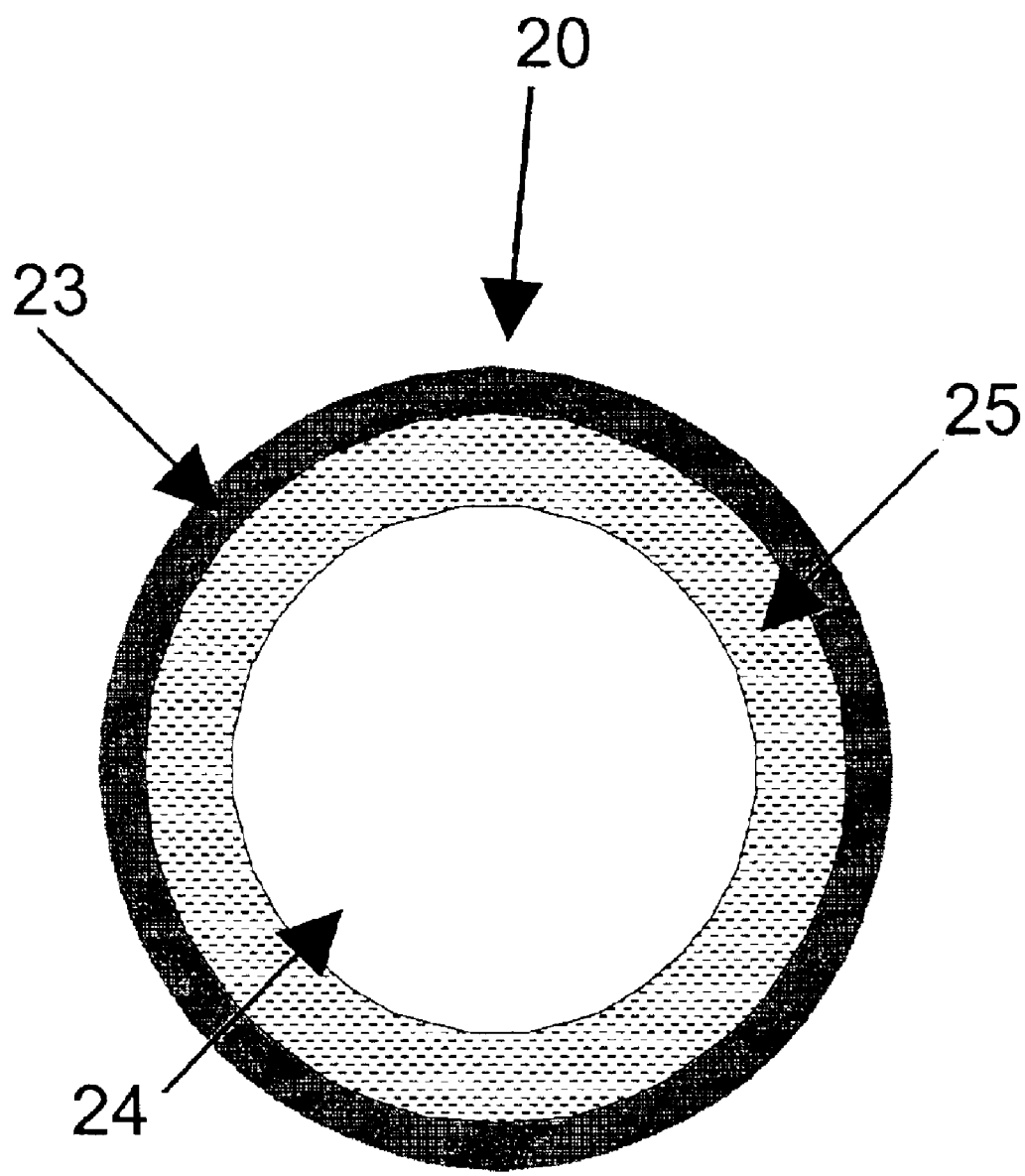
FIG. 3 is a cross-sectional view of a golf ball according to the invention incorporating an intermediate layer between the cover and the core.

Preferably, the intermediate layer includes a least one layer of a foamed or unfoamed grafted metallocene catalyzed polymer or polymer blend, but may also be formed from a non-grafted metallocene catalyzed polymer or polymer blend or from any other suitable polymeric material having the desired properties. A golf ball incorporating an intermediate layer is illustrated in FIG. 3, which depicts golf ball 20, having cover 23, core 24, and an intermediate layer 25 situated between the cover and the core. Any of cover 23, core 24, and intermediate layer 25 may incorporate at least one layer of a foamed or unfoamed grafted metallocene catalyzed polymer or polymer blend. Moreover, core 24 may be a one-piece core, a multi-layer core, or a wound core, having a solid or liquid center.

Either injection molding or compression molding may be used to form a layer or a core including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Golf balls according to the present invention may also be made using cores formed of conventional materials including, but not limited to, compositions having a base rubber, a crosslinking agent, a free radical initiator, and a density-adjusting filler. The base rubber typically includes one or more natural or synthetic rubbers. A preferred base rubber is a high Mooney viscosity unvulcanized rubber, such as 1,4-polybutadiene having at least about 40 percent of a cis-structure. Natural rubber, polyisoprene rubber and/or styrene-butadiene rubber may be optionally used in place of or added to the 1,4-polybutadiene. Additionally, the unvulcanized rubber, such as polybutadiene, in golfballs prepared according to the invention typically has a Mooney viscosity of about 20 or greater, preferably about 30 or greater, and more preferably about 40 or greater. In one embodiment, the core has a Mooney viscosity of about 50 to about 70. Mooney viscosity is typically measured according to ASTM D-1646-99. Crosslinking agents include metal salts of unsaturated fatty acids, such as zinc or magnesium salts acrylic or methacrylic acid. The filler typically includes materials such as zinc oxide, barium sulfate, silica, calcium carbonate, zinc carbonate and the like. In one embodiment, the core composition further includes a cis-to-trans catalyst.

Golf balls according to the invention may also incorporate cover layers including foamed or unfoamed grafted metallocene catalyzed polymers or polymer blends, non-grafted metallocene catalyzed polymers or polymer blends, or conventional materials, including balata and ionomer cover stock. Grafted metallocene catalyzed polymer blend cover layers according to the invention may be used with conventional solid or wound cores, as well as those including grafted or non-grafted metallocene catalyzed polymers or polymer blends. Preferably, the cover of a golf ball according to the invention is formed from a blend including at least one grafted metallocene catalyzed polymer and at least one ionomer.

Golf balls of the invention may also have conventional wound cores, i.e., a tensioned elastomeric wound layer disposed about the core. The compositions can also be used to form tensioned elastomeric layers for a wound ball. In one embodiment, the center of the golf ball is a liquid with tensioned elastomeric windings formed from a composition of the invention disposed thereon. In another embodiment, the cover is formed of a polyurethane, polyurea, epoxy material, or a combination thereof. In yet another embodiment, the cover is formed a soft polymer alloy ionomer. In one embodiment, the cover composition can be formed from a reactive injection molding process.

While the compositions of the present invention may be used in any layer of the golf ball, including cover layers, various other cover materials may be used. The cover layer(s) of the present invention may include at least one layer of a thermoplastic or thermosetting material. Any number of a wide variety of cover materials may be used in the present invention such as ionomer resins, polyurethanes, balata and blends thereof.

One embodiment uses the blends of the present invention as an intermediate or inner cover layer with a thin outer cover formed using a castable reactive liquid material. In this embodiment, additional intermediate layers may also be included in the golf ball and may also use variations of blends of the present invention.

Castable reactive liquid materials are particularly preferred for the outer cover layer. As used herein, the term "castable reactive liquid material" may refer to thermoset or thermoplastic materials. In a preferred embodiment, the castable reactive liquid material is a thermoset material.

In one embodiment, the castable reactive liquid material is cast urethane or polyurethane. Polyurethane is a product of a reaction between a polyurethane prepolymer and a curing agent. The polyurethane prepolymer is a product formed by a reaction between a polyol and a diisocyanate. Often a catalyst is employed to promote the reaction between the curing agent and the polyurethane prepolymer. In the case of cast polyurethanes, the curing agent is typically either a diamine or glycol.

In another preferred embodiment, the castable reactive liquid material is a thermoset cast polyurethane. Thermoset cast polyurethanes are generally prepared using a diisocyanate, such as 2,4-toluene diisocyanate (TDI), methylenebis-(4-cyclohexyl isocyanate) (HMDI), or paraphenylene diisocyanate (PPDI) and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine. However, any suitable cast or non-cast thermoset polyurethane may be employed to form outer cover layers of the present invention.

Other suitable thermoset materials contemplated for the cover layers include, but are not limited to, thermoset urethane ionomers and thermoset urethane epoxies. Examples of suitable thermoset polyurethane ionomers are disclosed in U.S. Pat. Nos. 5,334,673 and 5,692,974, which are incorporated in their entirety by reference herein. Other examples of thermoset materials include polybutadiene, natural rubber, polyisoprene, styrene-butadiene, or styrene-propylene-diene rubber, which are particularly suitable when used in an intermediate layer of a golf ball.

Golf Ball Properties

The properties such as hardness, modulus, core diameter, intermediate layer thickness and cover layer thickness of the golf balls of the present invention have been found to effect play characteristics such as spin, initial velocity and feel of the present golf balls.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used.

In one embodiment, the diameter of the core of the present invention is about 1.2 inches to about 1.630 inches. Preferably the diameter of the core is about 1.3 inches to about 1.6 inches. More preferably, the diameter of the core is about 1.39 inches to about 1.6 inches. The thickness of an intermediate layer of the invention, when present, is from about 0.002 inches to about 0.1 inches. Preferably, the thickness of the intermediate layer is about 0.01 inches to about 0.09 inches. Most preferably, the thickness of the intermediate layer is about 0.01 inches to about 0.06 inches. Furthermore, the thickness of the outer cover layer of the present invention is about 0.02 inches to about 0.12 inches. Preferably, the thickness of the cover layer is about 0.02 inches to about 0.1 inches.

In one embodiment, the ratio of the thickness of the intermediate layer to the outer cover layer is about 10 or less, preferably from about 3 or less. In another embodiment, the ratio of the thickness of the intermediate layer to the outer cover layer is about 1 or less.

When using a dual cover ball, an inner cover layer preferably has a thickness of 0.05 inches or less, more preferably about 0.01 inches to about 0.045 inches. In one embodiment, the inner cover thickness is about 0.035 inches. The outer cover layer of a dual cover ball is also preferably about 0.05 inches or less, preferably between about 0.02 inches and about 0.045 inches. In a preferred embodiment, the outer cover layer is about 0.025 to about 0.035 inches thick. In one embodiment, the outer cover layer is about 0.03 inches thick.

Preferably, the overall diameter of the core and all intermediate layers is about 80 percent to about 98 percent of the overall diameter of the finished ball.

Non-limiting examples of the various embodiments outlined above are provided here with respect to layer thickness. For example, in a wound ball using the composition of the invention in the tensioned elastomeric windings, the cover may have a thickness of about 0.07 inches or less. In another embodiment, the cover may have a thickness of about 0.02 inches or greater. In yet another embodiment, the cover is about 0.04 inches to about 0.07 inches.

When the compositions of the invention are used to form the outer cover of a golf ball, the cover may have a thickness of about 0.07 inches or less, preferably about 0.05 inches or less. In one embodiment, the outer cover has a thickness from about 0.02 inches to about 0.07 inches, preferably from about 0.02 inches to about 0.05 inches. In another embodiment, the core has a diameter of about 1.55 inches to about 1.65 inches.

When using the blends of the present invention as an intermediate or inner cover layer with a thin outer cover of castable reactive liquid material, the thickness of the outer layer may be less than about 0.06 inches, preferably from about 0.02 inches to about 0.06 inches. In another embodiment, the inner cover layer is from about 0.02 inches to about 0.04 inches. In another embodiment, the inner cover layer is about 0.03 inches to about 0.035 inches. In yet another embodiment, the inner cover layer is greater than about 0.4 inches, preferably from about 0.04 inches to about 0.06 inches. Varying combinations of these ranges of thickness for the inner and outer cover layers may be used in combination with other embodiments described herein.

The core may be a butadiene rubber with a diameter of about 1.5 inches to about 1.6 inches. In another embodiment, the core includes an inner core layer and outer core layer.

The inner core layer has a diameter of greater than about 0.09 inches, preferably from about 0.09 inches to about 1.2 inches. The outer core layer preferably has a thickness of at least about 0.1 inches, preferably from about 0.1 inches to about 0.8 inches.

Physical properties such as hardness and modulus of the various layers of the golf balls of the present invention are believed to impact the playing characteristics of such golf balls. For example, the flexural and/or tensile modulus of the intermediate layer are believed to have an effect on the "feel" of the golf balls of the present invention. Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

Similarly, it is preferable that the golf balls of the present invention have a cover layer with a flexural modulus about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

The golf ball of the present invention may have a core hardness of about 50 Shore A to about 90 Shore D. Preferably, the core has a Shore D hardness about 30 to about 65. More preferably, the core has a Shore D hardness about 35 to about 60.

The intermediate layers included in the golf balls of the invention may have a hardness of about 60 Shore A to about 85 Shore D. More preferably, the hardness of an intermediate layer is about 65 Shore A to about 80 Shore D. In one embodiment, the intermediate layer has a hardness of about 40 Shore D to about 75 Shore D.

In one embodiment, the cover layer(s) of the golf balls of the present invention preferably have a hardness about 40 Shore D to about 90 Shore D, more preferably about 45 Shore D to about 85 Shore D, and most preferably, about 50 Shore D to about 80 Shore D. In another embodiment, the cover layer has a hardness of about 30 Shore D to about 55 Shore D.

In one embodiment, the outer cover layer is softer than the intermediate layer or inner cover layer. In this embodiment, the ratio of the Shore D hardness of the outer cover to the intermediate layer is about 1.0 or less, preferably about 0.8 or less. In another embodiment, the ratio of the Shore D hardness of the outer cover to the intermediate layer is about 0.777 or less.

In another embodiment, the outer cover layer is harder than the intermediate layer or inner cover layer. In this design, the ratio of Shore D hardness of the intermediate layer to the core layer is about 1.33 or less, preferably from about 1.14 or less.

EXAMPLES

The following non-limiting examples are merely illustrative of the preferred embodiments of the present invention, and are not to be construed as limiting the invention, the scope of which is defined by the appended claims.

Examples 1–13

Polyamide-Nonionomer Blends

Tests were performed to compare the durability of a golf ball cover based on blends of a polyamide polymer and nonionomer polymers with conventional ball covers based on blends of ionomer resins. The polymer blends are given in Tables I through III.

TABLE I

PROPERTIES OF POLYAMIDE AND FUNCTIONALIZED SEBS GOLF BALL COVER BLENDS

|  | Example Number | | | |
| --- | --- | --- | --- | --- |
|  | 1 | 2 | 3 | 4 |
| Polyamide 12[a] | 25 | 50 | 75 | 85 |
| Functionalized SEBS[b] | 75 | 50 | 25 | 15 |
| Ball Cover Hardness (Shore D) | 51 | 62 | 72 | 74 |
| Initial Velocity[c] (ft/sec) | 250.5 | 251.4 | 252.8 | 253.4 |
| Coefficient of Restitution @ 125 ft/sec Inbound Velocity | 0.796 | 0.801 | 0.814 | 0.826 |
| Durability Test, First Failure at # of Hits Up to 600 Hits[e] | None | None | None | 50 |
| Durability Test, 50% Failure Up to 600 Hits[e] | None | None | None | 300 |
| Shear Resistance Rating[d] | 4.5 | 4.0 | 1.0 | 1.0 |

[a]RILSAN AMNO polyamide 12, flexural modulus of about 174,000 psi
[b]KRATON FG1901X (maleic anhydride grafted SEBS)
[c]Initial velocity of 1.580 inch diameter core = 252.2 ft/s
[d]1 is best, 5 is worst
[e]At room temperature

TABLE II

PROPERTIES OF POLYAMIDE AND BLOCK COPOLY(AMIDE) TPE
OR COPOLY(ESTER) TPE GOLF BALL COVER BLENDS

|  | Example Number | | | | |
|---|---|---|---|---|---|
|  | 5 | 6 | 7 | 8 | 9 |
| Polyamide 12[a] | 25 | 50 | 75 | 85 | 25 |
| Block Copoly(amide-ether)[b] | 75 | 50 | 25 | 15 | — |
| Block Copoly(ester-ether)[c] | — | — | — | — | 75 |
| Ball Cover Hardness (Shore D) | 47 | 62 | 69 | 72 | 45 |
| Initial Velocity[d] (ft/sec) | 252.1 | 251.7 | 252.7 | 253.5 | 250.7 |
| Coefficient of Restitution @ 125 ft/sec Inbound Velocity | 0.800 | 0.807 | 0.819 | 0.826 | 0.794 |
| Durability Test, First Failure at # of Hits Up to 600 Hits[f] | None | None | 400 | None | None |
| Durability Test, 50% Failure Up to 600 Hits[f] | None | None | 500 | None | None |
| Shear Resistance Rating[e] | 2.5 | 2.3 | 1.8 | 1.0 | 4.0 |

[a]RILSAN AMNO Polyamide 12, flexural modulus of about 174,000 psi
[b]PEBAX 3533
[c]HYTREL 3078
[d]Initial velocity of 1.580 inch diameter core = 252.2 ft/s for Examples 5–8, = 251.8 ft/s for Example 9
[e]1 is best, 5 is worst
[f]At room temperature

TABLE III

|  | Example Number | | | | | |
|---|---|---|---|---|---|---|
|  | C10 | C11 | C12 | C13 | Control 1 | Control 2[a] |
| SURLYN 7940[b] | 25 | 50 | 75 | 85 | 45 | 50 |
| SURLYN 8320[c] | 75 | 50 | 25 | 15 | 55 | — |
| Ball Cover Hardness (Shore D) | 53 | 57 | 65 | 69 | 57 | 72 |
| Initial Velocity[d] (ft/sec) | 250.8 | 251.3 | 252.6 | 252.9 | 251.3 | 253.8 |
| Coefficient of Restitution @ 125 ft/sec Inbound Velocity | 0.799 | 0.803 | 0.815 | 0.815 | 0.802 | 0.823 |
| Durability Test, First Failure at # of Hits Up to 600 Hits[f] | None | None | None | None | None | 250 |
| Durability Test, 50% Failure Up to 600 Hits[f] | None | None | None | None | None | 284 |
| Shear Resistance Rating[e] | 4.5 | 3.5 | 3.0 | 2.5 | 4.0 | 1.5 |

[a]50% SURLYN 7940/50% SURLYN AD8140 (17 percent to 20 percent acid ionomer partially neutralized with sodium)
[b]13–17% acid ionomer partially neutralized with lithium
[c]9–12% acid very low modulus ionomer partially neutralized with sodium
[d]Initial velocity of 1.580 inch diameter core = 252.2 ft/s
[e]1 is best, 5 is worst
[f]At room temperature In Tables I and II, the amount of each component is given in parts by weight, based on 100 parts of the polyamide-nonionomer blend, i.e., designated as phr or parts per hundred. Additionally, 5 parts of a first color concentrate is added to 100 parts of each blend of Examples 1 through 8. The first color concentrate consists of about 35 weight percent to about 45 weight percent of TiO$_2$ dispersed in a carrier polymer of polyamide 12 (RILSAN AMNO). In Table III, the amount of each component for the competitive examples and for the controls is given in parts by weight, based on 100 parts of the ionomer blend. Additionally, 5 parts of a second color concentrate is added to 100 parts of each blend of Examples C10 through C13, Control C1 and Control C2. The second color concentrate consists of about 35 weight percent to about 45 weight percent of TiO$_2$ dispersed in a carrier polymer of a commercial ethylene-based ionomer available from DuPont and believed to include 9 percent to 12 percent methacrylic acid and to be partially neutralized with sodium.

The initial velocity is determined using a Titleist-made Dual Pendulum Testing Machine configured to strike a golf ball with a face-plate angled at approximately 13□.

The coefficient of restitution (COR) is evaluated by shooting a golf ball out of an air cannon at a steel plate. COR is calculated by dividing the rebound velocity of the golf ball by the incoming velocity. Thus, a ball with a high coefficient of restitution dissipates a smaller fraction of its total energy when colliding with the plate and rebounding therefrom than does a ball with a low coefficient of restitution. COR testing is conducted over a range of incoming velocities and determined at an inbound velocity of 125 ft/s.

Durability is determined by using a hitting machine to hit a golf ball into a catching net, then automatically returning the ball into position where it is hit again. The test continues until the pre-set number of hits is reached, 600 hits being the maximum number of hits used herein, or until the golf ball fails, as judged by visual observations. A minimum sample size of 12 golf balls is used, each subjected to the pre-set number of hits. The golf balls are hit at room temperature, about 22□C.

The shear resistance rating is determined by using a Miya mechanical Golf Swing Machine to make two hits on each of 6 to 12 substantially identical golf balls of the same composition with either a sand wedge or a pitching wedge. First, the test conditions are adjusted and verified so that a control golf ball with a balata cover produces a rating of 5 on the shear resistance rating scale where a numerical rating from 1 (best: no visible damage to cover or paint) to 5 (worst: excessive cover shear, heavy material removal or severe material removal) is assigned. Following the calibration procedure, each experimental golf ball is tested and assigned a rating based upon visible manifestations of damage after being struck.

Golf ball cover hardness (Shore D) is determined by ASTM method D-2240 by placing the probe on the flat surface of the golf ball. Flexural modulus is determined by ASTM method D-790.

Examples 1 through 4 incorporate a cover blend of polyamide 12, available from Elf Atochem S. A., and a functionalized SEBS block copolymer TPE available from Shell USA. Examples 5 through 8 incorporate a cover blend of polyamide 12 and a TPE block copoly(amide-ether) available from Elf Atochem N. A. Example 9 incorporates a cover blend of polyamide 12 and a block copoly(ester-ether) available from DuPont.

Comparative Examples C10 through C13 incorporate a cover blend of two commercially available ethylene-based ionomers, a very low modulus ionomer believed to include 9 percent to 12 percent methacrylic acid and to be partially neutralized with sodium and an ionomer believed to include 13 percent to 17 percent methacrylic acid and to be partially neutralized with lithium, both available from DuPont.

Control 1 incorporates a cover blend of two commercially available ethylene-based ionomers (55 percent of a very low modulus ionomer believed to include 9 percent to 12 percent methacrylic acid and to be partially neutralized with sodium and 45 percent of an ionomer believed to include 13 percent to 17 percent methacrylic acid and to be partially neutralized with lithium) of the type such as is used in certain commercial golf balls for the purposes of comparison with the examples. Control 2 incorporates a cover blend of two commercially available ethylene-based ionomers (50 percent of an ionomer believed to include 13 percent to 17 percent methacrylic acid and to be partially neutralized with lithium and 50 percent of an ionomer believed to include 17 percent to 20 percent methacrylic acid and to be partially neutralized with sodium) of the type such as is used in certain commercial golf balls for the purposes of comparison with the examples.

When compared to the ionomer blend golf balls, the golf balls of the invention provide improved feel, comparable initial velocity, and equivalent or improved durability and shear resistance. The examples demonstrate that golf ball covers formed from blends incorporating polyamide 12 and a block copoly(amide-ether) TPE, a functionalized SEBS block copolymer TPE, or a TPE block copoly(ester-ether) can sustain at least 600 hits without failure of half of the golf balls undergoing durability testing.

Furthermore, the golf balls of all the examples have good initial velocity which approaches the upper limit for velocity of a struck golf ball, as defined by the Rules of Golf. These rules, as established by the USGA, include the following rule for initial velocity:

The velocity of the ball shall not be greater than 250 feet (76.2 m) per second when measured on apparatus approved by the USGA. A maximum tolerance of 2% will be allowed. The temperature of the ball when tested will be 23±1° C.

Thus, the maximum allowable initial velocity is 255 ft/s (250 ft/s plus the 2 percent tolerance of 5 ft/s) under the Rules of Golf. Therefore, golf ball manufacturers strive to come as close to the 255 ft/s maximum as possible without exceeding it to increase the distance over which a golfer can drive a golf ball. Thus, the improvement imparted by making golf balls from the compositions of the present invention which gets a golf ball closer to the 255 ft/s limit should be looked at favorably.

In addition, the golf balls of all the examples have shear resistance equal to or better than the comparative examples and controls. In particular, Examples 1 through 4 and 5 through 8 demonstrate that as the polyamide concentration increases in a golf ball cover blend including polyamide, the shear resistance of the cover improves.

Examples 14–26

Metallocene Catalyzed Polymer-Ionomer Blends

As shown in Table IV, batches of 10 to 15 dozen golf balls were prepared having covers incorporating blends of Surlyn 7940, a copolymer of ethylene and about 14 to about 16 percent methacrylic acid, having about 30 to about 60 percent of the acid groups neutralized with lithium and a Shore D hardness of about 68, blended with one of Exact 4033-MA, a maleic anhydride grafted ethylene-butene metallocene catalyzed polymer, Engage 8180-MA, a maleic anhydride grafted ethylene-octene metallocene catalyzed polymer, Exact 4049 an unfunctionalized ethylene-butene metallocene catalyzed polymer, Engage 8180, an unfunctionalized ethylene-octene metallocene catalyzed polymer, and Surlyn 8320, a very low modulus ionomer (VLMI), i.e., a terpolymer of ethylene, 8 percent to 11 percent methacrylic acid, and n-butyl acrylate, having about 40 to about 60 percent of the acid groups neutralized with sodium and a Shore D hardness of about 35.

TABLE IV

EFFECTS OF MALEIC ANHYDRIDE GRAFTED METALLOCENE COVER BLENDS ON BALL PROPERTIES

| Ingredients | #14 | #15 | #16 | #17 | #18 | #19 | #20 | #21 | #22 | #23 | #24 | #25 | #26 |
|---|---|---|---|---|---|---|---|---|---|---|---|---|---|
| Surlyn 7940 | 80.95 | 66.67 | 52.38 | 80.95 | 66.67 | 52.38 | 80.95 | 66.67 | 80.95 | 66.67 | 80.95 | 66.67 | 52.38 |
| Exact 4033-MA | 14.29 | 28.57 | 42.86 | | | | | | | | | | |
| Exact 4049 | | | | 14.29 | 28.57 | 42.86 | | | | | | | |
| Engage 8180-MA | | | | | | | 14.29 | 28.57 | | | | | |
| ENGAGE 8180 | | | | | | | | | 14.29 | 28.57 | | | |
| SURLYN 8320 | | | | | | | | | | | 14.29 | 28.57 | 42.86 |
| TiO$_2$ concentrate | 4.76 | 4.76 | 4.76 | 4.76 | 4.76 | 4.76 | 4.76 | 4.76 | 4.76 | 4.76 | 4.76 | 4.76 | 4.76 |
| Ball Properties | | | | | | | | | | | | | |
| Compression | 92 | 91 | 88 | 92 | 89 | 86 | 92 | 89 | 90 | 87 | 93 | 90 | 89 |
| HARDNESS (Shore D) | 64 | 60 | 54 | 64 | 58 | 53 | 64 | 58 | 62 | 57 | 67 | 62 | 58 |

TABLE IV-continued

EFFECTS OF MALEIC ANHYDRIDE GRAFTED METALLOCENE COVER BLENDS ON BALL PROPERTIES

| Ingredients | #14 | #15 | #16 | #17 | #18 | #19 | #20 | #21 | #22 | #23 | #24 | #25 | #26 |
|---|---|---|---|---|---|---|---|---|---|---|---|---|---|
| Initial velocity (ft/sec) | 252.5 | 252.2 | 251.6 | 252.1 | 252.0 | 251.6 | 252.2 | 251.9 | 251.9 | 251.7 | 252.2 | 251.3 | 250.8 |
| COR@125 ft/sec | 0.807 | 0.802 | 0.796 | 0.803 | 0.800 | 0.796 | 0.805 | 0.798 | 0.802 | 0.797 | 0.803 | 0.797 | 0.792 |

Note:
Surlyn 7940 is a copolymer of ethylene and methacrylic acid partially neutralized with Li ion
Exact 4033-MA is a maleic anhydride grafted ethylene-butene metallocene catalyzed copolymer
Engage 8180-MA is a maleic anhydride grafted ethylene-octene metallocene catalyzed copolymer
Exact 4049 is an unfunctionalized ethylene-butene metallocene catalyzed copolymer
Engage 8180 is an unfunctionalized ethylene-octene metallocene catalyzed copolymer
Surlyn 8320 is a terpolymer of ethylene and methacrylic acid and n-butyl acrylate partially neutralized with Na ion
$TiO_2$ concentrate is $TiO_2$ dispersed in Surlyn carrier resin containing 9–11% MAA partially neutralized with Na ion.

Golf balls incorporating blends including maleic anhydride functionalized metallocene catalyzed polymers (Table IV) have an initial velocity that is typically significantly better than that of golf balls having covers including VLMI or unfunctionalized metallocene catalyzed polymers in an amount equivalent to that of the maleic anhydride functionalized metallocene catalyzed polymers used in the examples. Moreover, the results shown in Table IV demonstrate that golf balls in accordance with the present invention provide performance that is at least as good, if not superior to golf balls having ionomer blend covers, while having a softer cover, which provides a softer "feel". Although the compression of each of the golf balls of the invention exemplified in Table IV is relatively low, i.e., having a PGA compression in the range of 88 to 92, which corresponds to a Riehle compression in the range of 72 to 68, the coefficient of restitution of the golf balls of the invention is at least as high, and, in many cases, significantly better than that of the high compression balls incorporating maleic anhydride modified polymers as disclosed in the Sullivan patents described above. Moreover, tests have shown that the golf balls of the invention are also far more durable than golf balls comprising ionomers blended with polymers formed using catalysts other than metallocenes.

Examples 27–41

Polyamide-Grafted Metallocene Polymer Blends

Tests were performed to compare the golf ball cover properties based on blends of a polyamide polymer and maleic anhydride grafted metallocene based ethylene-octene and ethylene-butene copolymers. The polymer blends are given in Table V, the amount of each component is given in parts by weight, based on 100 parts of the polyamide-grafted metallocene polymer blend, i.e., designated as phr or parts per hundred. Additionally, 5 parts of a first color concentrate is added to 100 parts of each blend. The color concentrate consists of about 60 weight percent to about 40 weight percent of $TiO_2$ dispersed in a carrier polymer of polyamide 12 (RILSAN AMNO). These examples demonstrate a two-piece ball, i.e., a core and cover.

TABLE V

GOLF BALL COVER COMPOSITIONS OF POLYAMIDE AND MALEIC ANHYDRIDE GRAFTED METALLOCENE COPOLYMERS

| Ingredients | #27 | #28 | #29 | #30 | #31 | #32 | #33 | #34 |
|---|---|---|---|---|---|---|---|---|
| RILSAN AMNO[a] | 100 | 85 | 70 | 55 | 40 | 85 | 70 | 55 |
| FUSABOND MO 525D[b] | | 15 | 30 | 45 | 60 | | | |
| FUSABOND MO 524D[c] | | | | | | 15 | 30 | 45 |
| FUSABOND MO 494D[d] | | | | | | | | |
| FUSABOND MO 499D[e] | | | | | | | | |
| $TiO_2$ concentrate | 5 | 5 | 5 | 5 | 5 | 5 | 5 | 5 |
| Material Properties | | | | | | | | |
| Density (g/cm³) | 1.024 | 1.002 | 0.975 | 0.956 | 0.937 | 0.994 | .0975 | 0.956 |
| Melt flow index (g/10 min)[f] | 15.2 | 5.2 | 2.7 | 2.4 | 0.3 | 6.8 | 3.2 | 1.9 |
| Flexural Modulus (kpsi@40 hrs) | 151.0 | 113.4 | 88.2 | 58.4 | 27.3 | 114.6 | 84.0 | 55.7 |
| Hardness (ShoreD) | 72 | 67 | 62 | 54 | 39 | 68 | 61 | 53 |
| Ball Properties | | | | | | | | |
| Compression | 110 | 107 | 103 | 99 | 92 | 107 | 103 | 99 |
| Cover Hardness (Shore D) | 75 | 71 | 66 | 60 | 48 | 69 | 64 | 57 |
| COR@125 ft/sec | —[h] | 0.82 | 0.80 | 0.80 | 0.80 | 0.81 | 0.80 | 0.80 |
| Initial velocity (ft/sec) | —[h] | 253.1 | 252.0 | 251.4 | 251.6 | 252.7 | 252.1 | 251.2 |
| First failure (hits)[g] | —[h] | 200 | 350 | >700 | >700 | 100 | 100 | >700 |

| Ingredients | #35 | #36 | #37 | #38 | #39 | #40 | #41 |
|---|---|---|---|---|---|---|---|
| RILSAN AMNO[a] | 40 | 25 | 85 | 70 | 55 | 70 | 55 |
| FUSABOND MO 525D[b] | | | | | | | |
| FUSABOND MO 524D[c] | 60 | 75 | | | | | |
| FUSABOND MO 494D[d] | | | 15 | 30 | 45 | | |
| FUSABOND MO 499D[e] | | | | | | 30 | 45 |

TABLE V-continued

GOLF BALL COVER COMPOSITIONS OF POLYAMIDE AND
MALEIC ANHYDRIDE GRAFTED METALLOCENE COPOLYMERS

|  |  |  |  |  |  |  |  |
|---|---|---|---|---|---|---|---|
| TiO$_2$ concentrate | 5 | 5 | 5 | 5 | 5 | 5 | 5 |
| Material Properties |  |  |  |  |  |  |  |
| Density (g/cm$^3$) | 0.936 | 0.923 | 0.933 | 0.975 | 0.957 | 0.981 | 0.959 |
| Melt flow index (g/10 min)$^f$ | 0.1 | 0.6 | 5.3 | 2.3 | 1.2 | 3.0 | 1.9 |
| Flexural Modulus (kpsi@40 hrs) | 27.3 | 9.8 | 114.5 | 79.0 | 46.8 | —$^i$ | —$^i$ |
| Hardness (ShoreD) | 40 | 28 | 67 | 61 | 53 | —$^i$ | —$^i$ |
| Ball Properties |  |  |  |  |  |  |  |
| Compression | 93 | 90 | 106 | 103 | 97 | 103 | 99 |
| Cover Hardness (Shore D) | 47 | 41 | 69 | 65 | 59 | 66 | 60 |
| COR@125 ft/sec | 0.80 | 0.80 | 0.81 | 0.80 | 0.80 | 0.80 | 0.80 |
| Initial velocity (ft/sec) | 251.6 | 251.8 | 252.3 | 251.5 | 251.2 | 251.5 | 251.1 |
| First failure (hits)$^g$ | >700 | >700 | 100 | 100 | 150 | 400 | 300 |

$^a$RILSAN AMNO Polyamide 12, flexural modulus of about 174,000 psi
$^b$FUSABOND MO 525D is a 0.9 percent maleic anhydride grafted ethylene-butene metallocene catalyzed copolymer, flexural modulus of about 2790 psi
$^c$FUSABOND MO 524D is a 0.5 percent maleic anhydride grafted ethylene-butene metallocene catalyzed copolymer, flexural modulus of about 2610 psi
$^d$FUSABOND MO 494D is a 0.9 percent maleic anhydride grafted ethylene-octene metallocene catalyzed copolymer, flexural modulus of about 2520 psi
$^e$FUSABOND MO 499D is a 0.5 percent maleic anhydride grafted ethylene-octene metallocene catalyzed copolymer, flexural modulus of about 2150 psi
$^f$Melt flow index at 190° C./2.16 kg load
$^g$First failure in impact durability at room temperature
$^h$Balls failed during testing
$^i$Test data not available As shown in Table V, increasing the amount of maleic anhydride in the grafted metallocene catalyzed copolymer improves impact durability through increased compatibility with polyamide 12. Example 27 shows a golf ball with no material blended with polyamide is not as durable upon impact as compared to golf balls of Examples 28–41 containing a polyamide-grafted metallocene catalyzed polymer blend.

In addition, of the two types of grafted metallocene catalyzed copolymers used in the experimental blends, the grafted metallocene catalyzed ethylene-butene copolymer appears to improve the golf ball resiliency more effectively than the grafted metallocene catalyzed ethylene-octene copolymer.

Examples 42–44

Polyamide Blends

Tests were performed to compare the golf ball properties formed with a 1.55 inch polybutadiene core (core compression of about 76, COR of about 0.802, Shore C hardness of about 78), a polyamide inner cover having about 0.035 thickness, and a thin cast light stable polyurethane outer cover based on aliphatic H$_{12}$ MDI-based prepolymer and an aliphatic curative such as 1,4 butanediol disposed thereon. Examples of suitable aliphatic polyurethanes are disclosed in co-pending U.S. patent application Ser. Nos. 09/466,434, entitled "Golf Ball Comprising Saturated Polyurethanes and Methods of Making Same", filed Dec. 17, 1999, 09/453,701, entitled "Golf Ball Comprising Water Resistant Polyurethane Elastomers and Method for Making Same", filed Dec. 3, 1999, 09/861,909, entitled "Urethane Elastomers With Improved Color Stability", filed May 21, 2001, 09/833,667, entitled "Golf Balls Containing Interpenetrating Polymer Networks", filed Apr. 13, 2001, 09/812,910, entitled "Golf Balls Formed With a Saturated Polyurethane Composition", filed Mar. 20, 2001, and 09/924, 562, entitled "Golf Balls Comprising Saturated Polyurethane and a UV Absorber," filed Aug. 8, 2001, the entire disclosures of which are incorporated by reference herein. Table VI demonstrates the use of polyamide blends in the inner cover of a golf ball.

TABLE VI

GOLF BALL INNER COVER COMPOSITIONS OF POLYAMIDE

| Ingredients | #42 | #43 | #44 |
|---|---|---|---|
| Ionomer$^a$ | 100 |  |  |
| JCF-99A$^b$ |  | 100 |  |
| JCF-99B$^c$ |  |  | 100 |
| Properties of Inner Cover Layer |  |  |  |
| Density(g/cm3) | 0.960 | 1.008 | 1.006 |
| Melt flow index (g/10 min)d | 2.3 | 13.6 | 19.8 |
| Flexural Modulus (kpsi @ 2 wks.) | 56.9 | 83.9 | 92.3 |
| Hardness (Shore D @ 2 wks.) | 60 | 68 | 69 |
| Hardness (Shore C @ 2 wks.) | 89 | 94 | 95 |
| Compression | 82 | 88 | 85 |
| COR @ 125 ft/sec | 0.81 | 0.81 | 0.81 |
| Adhesion to Outer Cover | Poor | Excellent | Excellent |

$^a$Surlyn 7940/8940 (w/w)
$^b$JCF-99A is available from Shakespeare of Columbia, SC as a 65/35 mol percent blend of polyamide 6,10 and 6,36, flexural modulus of about 80,000 psi
$^c$JCF-99B is available from Shakespeare of Columbia, SC as a 70/30 mol percent blend of polyamide 6,10 and 6,36
$^d$Melt flow index at 190° C./2.16 kg load Polyamide 6,10/6,36 was used to form the inner cover, i.e., a combination of polyamide 6,10 and polyamide 6,36, wherein polyamide 6,36 is a hydrophobic 36-carbon chain copolymer of hexamethylene diamine with a dimer acid. Example 42 shows a prior art ball with an ionomer resin as the inner cover, a cast polyurethane outer cover, and a 1.55 inch polybutadiene core. Example 43 shows an inner cover blend of 65 mol percent polyamide 6,10 and 35 mol percent polyamide 6,36. Example 44 shows an inner cover blend of 70 mol percent polyamide 6,10 and 30 mol percent polyamide 6,36.

As shown in Table VI, the use of a polyamide in the inner cover layer results in a golf ball with similar compression to the prior art golf ball, while still maintaining a high COR.

In addition, the prior art ball shown in Example 42 did not exhibit adequate adherence between the inner cover layer and outer cover layer of the finished golf ball. Examples 43–44 exhibited excellent adherence to between the inner cover layer and the light stable polyurethane outer cover layer.

Examples 45–50

Polyamide-Ionomer Blends

Tests were performed to compare the golf ball properties formed with a 1.55 inch polybutadiene core (compression of about 72, COR of about 0.798, Shore C hardness of about 78), a polyamide-ionomer inner cover having a thickness of about 0.035 inches, and a thin cast polyurethane outer cover having a thickness of about 0.03 inches disposed thereon. Table VII shows various blends of polyamides and ionomers, as well as blends of polyamides, ionomers, and metallocene catalyzed polymers.

TABLE VII

GOLF BALL INNER COVER COMPOSITIONS OF POLYAMIDE-IONOMER BLEND

| Ingredients | #45 | #46 | #47 | #48 | #49 | #50 | #51 |
|---|---|---|---|---|---|---|---|
| JCF 95A/96B[a] | | 50 | 50 | 20 | 50 | 20 | 20 |
| SURLYN 9945[b] | | 50 | | 40 | | | |
| SURLYN 9120[c] | | | 25 | 40 | | | 50 |
| SURLYN 7940[d] | 50 | | 25 | | | | |
| SURLYN 8940[e] | 50 | | | | | | |
| RILSAN AMNO[f] | | | | | 50 | 80 | |
| NUCREL 960[g] | | | | | | | 10 |
| Syndiotactic PP (0.9% MA)[h] | | | | | | | 20 |
| Material Properties | | | | | | | |
| Density (g/cm3) | — | 0.976 | 0.970 | 0.971 | 0.997 | 1.005 | 0.951 |
| Melt flow index (g/10 min)[i,j] | 2.3 | 6.38 | 0.18[j] | 0.15[j] | 41.7 | 19.7 | —[l] |
| Flexural Modulus (kpsi @ 2 wks.) | 56.9 | 42.0 | 49.6 | 51.7 | 88.5 | 115.2 | 49.8 |
| Hardness (Shore D @ 2 wks.) | 60 | 56 | 61 | 61 | 61 | 65 | 58 |
| Hardness (Shore C @ 2 wks.) | 89 | 86 | 86 | 84 | 87 | 89 | 89 |

[a]JCF-95A and JCF-96B are available from Shakespeare of Columbia, SC as a 35/65 mol percent blend of polyamide 6,10 and 6,36, flexural modulus of about 36,000 psi
[b]Surlyn 9945 is a copolymer of ethylene and methacrylic acid partially neutralized with Zn ion
[c]Surlyn 9120 is a copolymer of ethylene and methacrylic acid partially neutralized with Zn ion
[d]Surlyn 7940 is a copolymer of ethylene and methacrylic acid partially neutralized with Li ion
[e]Surlyn 8940 is a copolymer of ethylene and methacrylic acid partially neutralized with Na ion
[f]RILSAN AMNO Polyamide 12, flexural modulus of about 174,000 psi
[g]NUCREL 960 is an ethylene-methacrylic acid copolymer having a Shore D of 46
[h]Syndiotactic PP (0.9% MA) is a 0.9 percent maleic anhydride grafted ethylene-propylene metallocene catalyzed copolymer
[i]Melt flow index at 190° C./2.16 kg load
[j]Melt flow index at 235° C./2.16 kg load
[k]Balls failed during testing
[l]Test data not available Polyamide 6,10/6,36 was used with an ionomer to form the inner cover. Example 45 shows a prior art inner cover formulation of two ionomers. Example 46 shows a golf ball with a polyamide (35 mol percent polyamide 6,10 and 65 mol percent polyamide 6,36)-ionomer resin (copolymer of ethylene and methacrylic acid partially neutralized with Zn ion) inner cover, a cast polyurethane outer cover, and a 1.55 inch polybutadiene core. Examples 46 and 47 are golf balls with a polyamide (35 mol percent polyamide 6,10 and 65 mol percent polyamide 6,36)-dual ionomer resin blend (copolymer of ethylene and methacrylic acid partially neutralized with Zn and Li ions) inner cover, a cast polyurethane outer cover, and a 1.55 inch polybutadiene core. Examples 48 and 49 are golf balls containing only polyamide in the inner cover formulation, i.e., 35 mol percent polyamide 6,10 and 65 mol percent polyamide 6,36 blended with polyamide 12. Example 50 demonstrates a polyamide (35 mol percent polyamide 6,10 and 65 mol percent polyamide 6,36)-ionomer resin (copolymer of ethylene and methacrylic acid partially neutralized with Zn ion)-grafted metallocene catalyzed polymer inner cover, a cast polyurethane outer cover, and a 1.55 inch polybutadiene core.

Other than the control, Example 45, only Examples 46 and 50 contained an only inner cover formulation that did not fail during COR testing. Both examples exhibited comparable COR to the control ball.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

What is claimed is:

1. A golf ball comprising a core and a cover, wherein at least a portion of the cover is formed from a composition comprising a polyamide copolymer formed from reactants consisting essentially of at least one dibasic acid and at least one diamine, wherein the at least one dibasic acid comprises about 14 carbons to about 40 carbons, and wherein the polyamide copolymer lacks affinity for water.

2. The golf ball of claim 1, wherein the polyamide copolymer has a flexural modulus of about 5,000 psi to about 200,000 psi.

3. The golf ball of claim 1, wherein the cover comprises an inner cover and an outer cover, and wherein the outer cover is formed of a composition comprising a castable reactive liquid material.

4. The golf ball of claim 3, wherein the castable reactive liquid material comprises thermoset cast polyurethane, polyurea, epoxy, reaction injection moldable materials, or mixtures thereof.

5. The golf ball of claim 3, wherein the layer is an inner cover layer having a thickness of about 0.02 inches to about 0.06 inches.

6. The golf ball of claim 5, wherein the inner cover layer has a thickness of about 0.02 inches to about 0.35 inches.

7. The golf ball of claim 3, wherein the outer cover has a thickness of about 0.02 inches to about 0.035 inches.

8. The golf ball of claim 3, wherein the core has a diameter of about 1.5 inches to about 1.6 inches.

9. The golf ball of claim 8, wherein the core comprises an inner core layer and an outer core layer.

10. The golf ball of claim 1, wherein the polyamide copolymer is ionomeric and comprises a sulfonated moiety, a carboxylated moiety, or a combination thereof.

11. The golf ball of claim 1, wherein the cover comprises an inner cover and an outer cover, and wherein the golf ball has at least one of a ratio of the Shore D hardness of the outer cover to the inner cover of about 1.0 or less, a ratio of the thickness of the inner cover to the outer cover of about 3 or less, or a ratio of the flexural modulus of the inner cover to the outer cover of about 0.11 to about 4.5.

12. The golf ball of claim 1, wherein the polyamide is selected from the group consisting of polyamide 66,6,18, polyamide 66,6,36, polyamide 6/6,18, polyamide 6/6,36, polyamide 6/6,10/6,18, polyamide 6/6,10/6,36, polyamide 6,10/6,18, polyamide 6,12/6,18, polyamide 6,12/6,36, polyamide 6/66/6,18, polyamide 6/66/6,36, polyamide 66/6, 10/6,18, polyamide 66/6,10/6,36, polyamide 6/6,12/6,18, polyamide 6/6,12/6,36, and mixtures thereof.

13. A golf ball comprising a core, an intermediate layer, and a cover, wherein the intermediate layer is formed from a composition comprising a polyamide copolymer formed from at least one dibasic acid and at least one diamine, wherein the at least one dibasic acid comprises about 14 carbons to about 40 carbons, and wherein the polyamide copolymer lacks affinity for water.

14. The golf ball of claim 13, wherein the polyamide copolymer has a flexural modulus of about 50,000 psi to about 100,000 psi.

15. The golf ball of claim 13, wherein the polyamide copolymer has a melt index of about 0.5 grams in a ten-minute period to about 100 grams in a ten-minute period.

16. The golf ball of claim 13, wherein the polyamide copolymer is ionomeric.

17. The golf ball of claim 13, wherein the polyamide copolymer is non-ionomeric.

18. The golf ball of claim 13, wherein the cover is formed from a castable reactive liquid material.

19. The golf ball of claim 18, wherein the cover has a thickness of about 0.02 inches to about 0.06 inches.

20. A golf ball comprising a core, an inner cover, and an outer cover, wherein at least a portion of the cover is formed from a composition comprising a hydrophobic polyamide copolymer formed from reactants consisting essentially of at least one dibasic acid and at least one diamine, wherein the at least one dibasic acid comprises about 14 carbons to about 40 carbons, and wherein having at least one of a ratio of the Shore D hardness of the outer cover to the inner cover of about 1.0 or less, a ratio of the thickness of the inner cover to the outer cover of about 3 or less, or a ratio of the flexural modulus of the inner cover to the outer cover of about 0.11 to about 4.5.

21. The golf ball of claim 20, wherein the composition further comprises an ionomer, wherein the ionomer comprises an E/X/Y copolymer where E comprises ethylene, X comprises a softening comonomer from about 0 weight percent to about 50 weight percent of the copolymer, and Y comprises an $\alpha$, $\beta$-ethylenically unsaturated carboxylic acid from about 5 weight percent to about 35 weight percent of the copolymer, wherein about 1 percent to about 100 percent of the carboxylic acid is neutralized with a metal ion.

22. The golf ball of claim 20, wherein the composition further comprises a non-ionomer.

23. The golf ball of claim 22, wherein the nonionomer is a thermoplastic elastomer or thermoplastic material.

24. A golf ball comprising a core, an inner cover layer, and an outer cover layer, wherein the inner cover layer is formed from a composition comprising a hydrophobic polyamide copolymer formed from at least one dibasic acid and at least one diamine, wherein the at least one dibasic acid comprises about 14 carbons to about 40 carbons, and wherein the outer cover layer is formed of a castable reactive liquid material.

25. The golf ball of claim 24, wherein the castable reactive liquid material comprises thermoset cast polyurethane, polyurea, epoxy, reaction injection moldable materials, or mixtures thereof.

* * * * *